United States Patent
Zhou et al.

(10) Patent No.: US 12,149,441 B2
(45) Date of Patent: Nov. 19, 2024

(54) DETERMINING FLOW PATHS OF PACKETS THROUGH NODES OF A NETWORK

(71) Applicant: VMware, Inc., Palo Alto, CA (US)

(72) Inventors: Wenxuan Zhou, Mountain View, CA (US); Giri Prashanth Subramanian, Sunnyvale, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/343,038

(22) Filed: Jun. 28, 2023

(65) Prior Publication Data

US 2023/0344755 A1 Oct. 26, 2023

Related U.S. Application Data

(62) Division of application No. 16/748,660, filed on Jan. 21, 2020, now Pat. No. 11,757,768.

(51) Int. Cl.
| | |
|---|---|
| *H04L 45/00* | (2022.01) |
| *H04L 9/40* | (2022.01) |
| *H04L 41/12* | (2022.01) |
| *H04L 41/22* | (2022.01) |
| *H04L 45/122* | (2022.01) |

(Continued)

(52) U.S. Cl.
CPC .............. *H04L 45/38* (2013.01); *H04L 41/12* (2013.01); *H04L 41/22* (2013.01); *H04L 45/122* (2013.01); *H04L 45/741* (2013.01); *H04L 63/0245* (2013.01); *H04L 2101/622* (2022.05)

(58) Field of Classification Search
CPC ... H04L 2101/622; H04L 41/12; H04L 41/22; H04L 45/122
See application file for complete search history.

(56) References Cited

U.S. PATENT DOCUMENTS 9,225,601 B2 12/2015 Khurshid et al.
10,771,379 B2 * 9/2020 Thomas ................. H04L 45/02
(Continued)

FOREIGN PATENT DOCUMENTS

CN 1595901 A * 3/2005
CN 104270312 A * 1/2015

OTHER PUBLICATIONS

Khurshid et al. "VeriFlow: Verifying Network-Wide Invariants in Real Time," 10th USENIX Symposium on Networked Systems Design and Implementation (NSDI 13), 2013, pp. 15-27 (13 pages).
(Continued)

*Primary Examiner* — Zhensheng Zhang
(74) *Attorney, Agent, or Firm* — Kim & Stewart LLP

(57) ABSTRACT

A search engine queries a network model for behavior of the entire network, such as data flow, based on combinations of multiple network elements. The search engine provides the state information and/or predicted behavior of the network by searching network objects in a graph-based model or a network state database that satisfy constraints given in a search query. The search engine provides the state information and/or predicted behavior based on regular-expression or plain language search expressions that do not provide packet header information. The search engine parses such search expression into a sequence of atoms that encode forwarding paths of interest to the user. A flow path through the modeled network can be generated dynamically, within the context of the search queries.

8 Claims, 31 Drawing Sheets

(51) Int. Cl.
*H04L 45/741* (2022.01)
*H04L 101/622* (2022.01)

(56) References Cited

U.S. PATENT DOCUMENTS 10,862,749 B1 12/2020 Kiyak et al.
2004/0267732 A1 12/2004 Luk et al.
2014/0173085 A1 6/2014 Gupta
2016/0344772 A1 11/2016 Monahan et al.

OTHER PUBLICATIONS

U.S. Appl. No. 15/683,650, filed Aug. 22, 2017.

* cited by examiner

410

| VLAN 411 | MAC Address 412 | Port 413 |
|---|---|---|
| 1 | 0001.c7ad.e316 | Fao/1 |
| 1 | 0002.4ab7.1702 | Fao/2 |
| 1 | 0001.c54c.f233 | Fao/3 |
| 1 | 0001.a67a.b371 | Fao/4 |
| 2 | 0001.c7ad.e316 | Fao/11 |
| 2 | 000d.bd94.6b58 | Fao/12 |
| 2 | 0061.3e5c.ba1d | Fao/13 |
| 2 | 00c0.f934.3ec4 | Fao/14 |
| 3 | 0001.c66d.613c | Fao/21 |
| 3 | 0056.bf22.6b55 | Fao/22 |
| 3 | 0001.c7ad.e316 | Fao/24 |
| ... | ... | ... |

| Internet Address 421 | MAC Address 422 | VLAN 423 | Interface ID 424 |
|---|---|---|---|
| 192.168.0.6 | 0001.c7ad.e316 | 1 | eth0 |
| 192.168.0.7 | 0002.4ab7.1702 | 1 | eth1 |
| 192.168.0.9 | 0001.c54c.f233 | 1 | eth2 |
| 225.0.5.0 | 0001.a67a.b371 | 1 | eth3 |
| 225.0.5.151 | 0001.ddad.3377 | 2 | eth4 |
| 225.0.5.75 | 000d.bd94.6b58 | 2 | eth5 |
| 225.0.5.76 | 0061.3e5c.ba1d | 2 | eth6 |
| ⋮ | ⋮ | ⋮ | ⋮ |

| Interface ID 431 | MAC Address 432 | VLAN ID 433 |
|---|---|---|
| eth0 | 0001.c7ad.e316 | 1 |
| eth1 | 0002.4ab7.1702 | 1 |
| eth2 | 0001.c54c.f233 | 1 |
| eth3 | 0001.a67a.b371 | 1 |
| eth4 | 0001.ddad.3377 | 2 |
| eth5 | 000d.bd94.6b58 | 2 |
| eth6 | 0061.3e5c.ba1d | 2 |
| ... | ... | ... |

| Flow ID 601 | Residing Device 602 | Interface 603 | Termination Indicator 604 |
|---|---|---|---|
| F1 (= MAC331) | D1 | MAC311 | N |
| F2 (= MAC321) | D1 | MAC311 | N |
| F1 | D2 | MAC322 | N |
| F2 | D2 | MAC321 | Y |
| F1 | D3 | MAC331 | Y |
| ... | ... | ... | ... |

| IP Address Range 1601 | Interface For Routing Traffic |
|---|---|
| 10.0.0.0/24 | 1511 |
| 20.0.0.0/24 | 1512 |
| 30.0.0.0/24 | 1513 |
| 40.0.0.0/24 | 1514 |

| IP Address Range 1701 | Interface For Routing Traffic |
|---|---|
| 20.0.0.0/24 | 1521 |
| 30.0.0.0/24 | 1521 |
| 40.0.0.0/24 | 1521 |
| 0.0.0.0/24 | 1522 |

FIG. 17

| IP Address Range 1801 | Interface For Routing Traffic |
|---|---|
| 20.0.0.0/24 | 1531 |
| 30.0.0.0/24 | 1531 |
| 40.0.0.0/24 | 1531 |

DETERMINING FLOW PATHS OF PACKETS THROUGH NODES OF A NETWORK

CROSS-REFERENCE

This application is a division of U.S. patent application Ser. No. 16/748,660, filed Jan. 21, 2020, which is incorporated by reference herein.

BACKGROUND

The present disclosure relates to the field of data networks, and, more specifically, to systems and methods for determining flow paths of packets through nodes of a network.

Computer networks are essential for the day-to-day operations of many organizations, including business enterprises, government entities, network service providers, online streaming services, and the like. For example, such organizations rely on computer networks for storing and retrieving data, enabling communication between employees, and providing services to customers.

However, as the complexity and scale of modern computer networks has increased, the development of tools to manage their operation has not kept pace. For example, for network administrators to fully understand and manage a computer network, a clear understanding of the state of the network and flow behavior of data traffic in the network is essential. Unfortunately, tools now available only provide current state information about individual devices, such as servers, routers, and interface, and cannot predict overall behavior of a network or flow of data traffic within a network. Instead, network administrators are limited to monitoring on-going traffic and reacting to problems as they are detected.

SUMMARY

One or more embodiments provide improvements in a path search algorithm using search queries that do not provide packet header information. Further, a flow path through the modeled network can be generated dynamically, within the context of the search queries.

According to one embodiment, a method of determining a flow path between two devices in response to a search query, includes the steps of: determining source and destination IP addresses from IP addresses of the two devices specified in the search query; determining a first subnet associated with the source IP address and a second subnet associated with the destination IP address; upon determining that the first subnet and the second subnet are the same subnet, determining a first flow path between a first device associated with the source IP address and a second device associated with the destination IP address, using the destination IP address and a MAC address of the second device; and upon determining that the first subnet and the second subnet are not the same subnet, determining a second flow path between the first device and the second device using the destination IP address and a MAC address of a gateway device of the first subnet.

According to another embodiment, a method of determining a flow path of a packet set in response to a search query, includes preparing a graph model in which devices of the network are modeled as nodes of the network; extracting source and destination IP addresses from a packet set specified in the search query; beginning at a first node corresponding to the source IP address and ending with a second node corresponding to the destination IP address, iteratively determining a next hop for the packet set; and displaying the flow path of the packet set from the first node to the second node.

Further embodiments include a non-transitory computer-readable storage medium comprising instructions that cause a computer system to carry out the above methods, as well as a computer system configured to carry out the above methods.

BRIEF DESCRIPTION OF THE DRAWINGS

So that the manner in which the above recited features of embodiments can be understood in detail, a more particular description of embodiments, briefly summarized above, may be had by reference to the appended drawings. It is to be noted, however, that the appended drawings illustrate only typical embodiments and are therefore not to be considered limiting of its scope, for the invention may admit to other equally effective embodiments.

FIGS. 4A-4C schematically illustrate reachability information stored by network devices of the data communication network of FIG. 2, according to an embodiment.

FIG. 6 illustrates an address location hash map of flow identifiers for a portion of a data communication network, according to an embodiment.

FIG. 16 is a schematic illustration of a routing table of the customer edge device of FIG. 15, according to an embodiment.

FIG. 17 is a schematic illustration of a routing table of the provider edge device of FIG. 15, according to an embodiment.

For clarity, identical reference numbers have been used, where applicable, to designate identical elements that are common between figures. It is contemplated that features of one embodiment may be incorporated in other embodiments without further recitation.

DETAILED DESCRIPTION

Topology Inference

Figure 1:
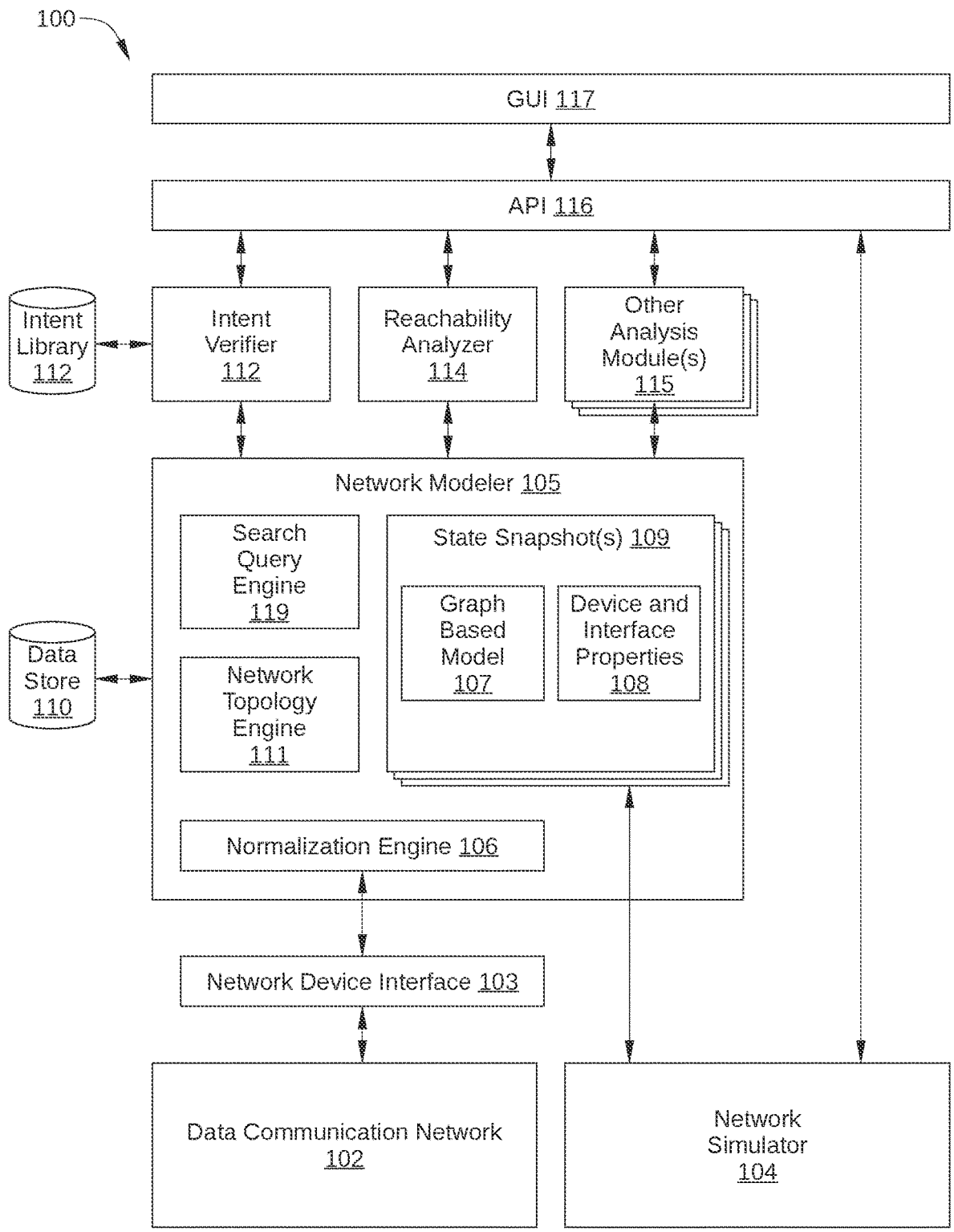
FIG. 1 illustrates a network topology inference system for modeling and analyzing a data communication network, according to various embodiments.

FIG. 1 illustrates a network topology inference system 100 for modeling and analyzing a data communication network 102, according to various embodiments. In some embodiments, network topology inference system 100 collects network state information directly from network devices of data communication network 102 and constructs a functional model of data communication network 102. The functional model is based on a physical network topology describing what network devices are coupled to each other via a physical communication link, such as a wired connection. According to various embodiments, network topology inference system 100 infers the presence of each physical communication link between network devices based on network traffic that is currently flowing in the network.

In some embodiments, network topology inference system 100 is further configured as a network verification system. In such embodiments, network topology inference system 100 is further configured to model the results of policy verifications that can be used to (a) configure or reconfigure devices within the network to eliminate the violation, (b) trigger an alert on an external network management or security monitoring system, (c) visually illustrate problems in the network to users of the system, and/or (d) trigger an automated change to configurations or block such a change if policy verifications pass or fail. An example of a network verification system is described in U.S. Pat. No. 9,225,601, entitled "Network-Wide Verification of Invariants," the entire content of which is hereby incorporated by reference.

Network topology inference system 100 is communicatively coupled to network 102, which includes a plurality of network devices (not shown), such as firewalls, routers, switches, virtual switches, etc., via a network device interface 103. Device state information for the plurality of network devices is extracted and sent to a network modeler 105. In addition, in some embodiments, a network simulator 104 produces hypothetical device state information, which is also sent to network modeler 105. In such embodiments, the hypothetical device state information can simulate the effect of a configuration change prior to deployment. Network modeler 105 normalizes input via a normalization engine 106 to produce a single format across a plurality of network device types or manufacturers. In addition, network modeler 105 produces one or more (real or hypothetical) snapshots 109 of data communication network 102 that can include a graph-based model 107 of potential data flow behavior and/or a variety of attributes or properties of devices and interfaces or other objects in data communication network 102. Network topology inference system 100 may store a multiplicity of snapshots 109 to form a network state database, in memory and/or mass storage, such as in data store 110. Network topology inference system 100 also includes a search query processor 119 to query a network model of data communication network 102 to obtain objects and data flow behavior. Network topology inference system 100 may also include higher-level analysis modules for querying a particular network model, such as an intent verifier 112 to verify whether network intent matches that of the particular network model, drawing on intent rules built from an intent library 113; a reachability analyzer 114; and potentially other analysis modules 115. The functionality of the verification and analysis models, network modeler 105, and network simulator 104 may be available via an application programming interface (API) 116, which programs and scripts can access directly, and on which a graphical user interface 117 can be built.

Figure 2:
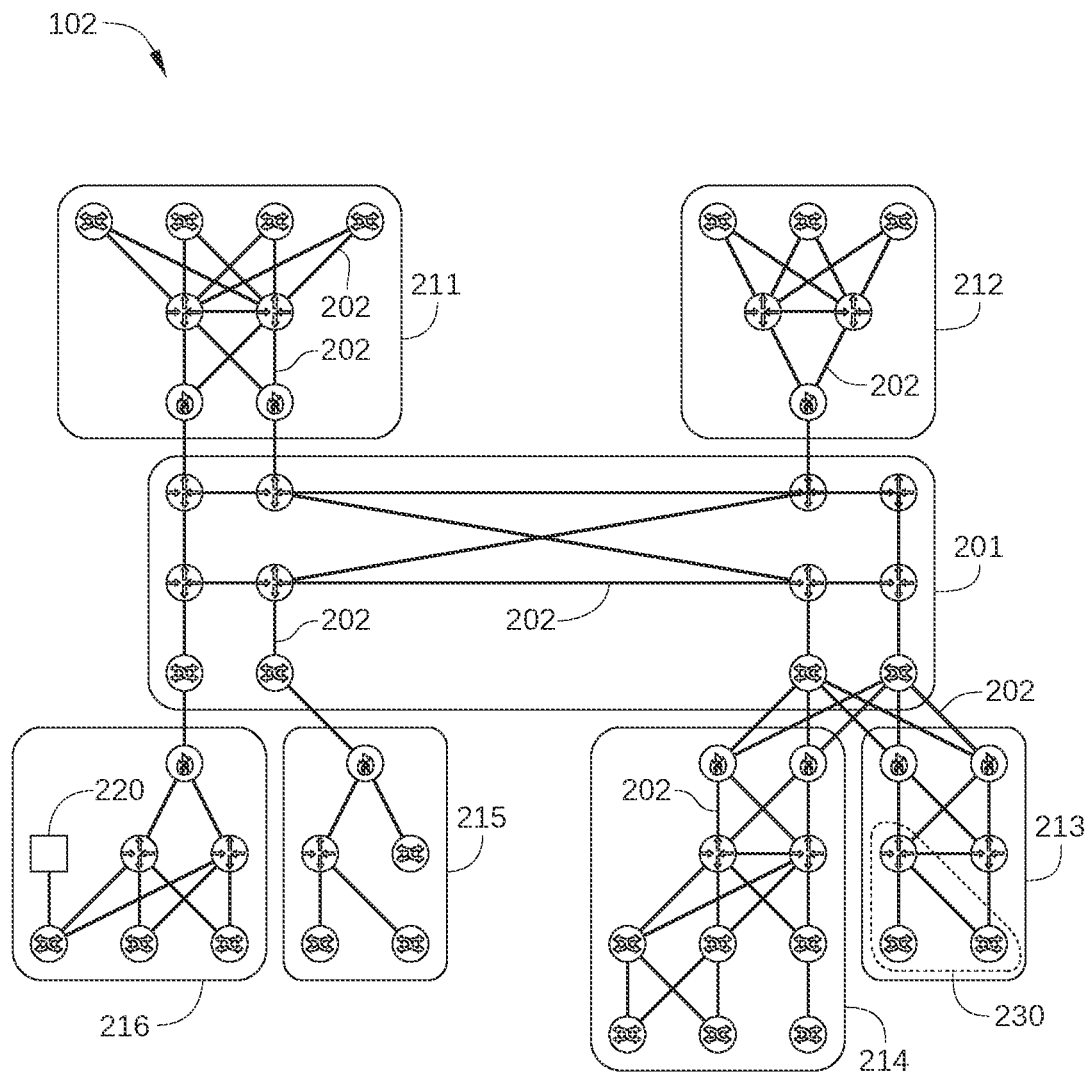
FIG. 2 is a schematic illustration of the data communication network that is coupled to the network topology inference system of FIG. 1, according to an embodiment.

FIG. 2 is a schematic illustration of data communication network 102, according to an embodiment. Data communication network 102 is a computer network that is communicatively coupled to network topology inference system 100 and includes one or more network devices, such as firewalls, routers, switches, and the like, and a plurality of host devices, such as desktop computers, servers, and the like. In the embodiment illustrated in FIG. 2, data communication network 102 is configured with a backbone 201 and subnets 211-215. Backbone 201 and subnets 211-215 each include one or more firewalls, routers, and/or switches, and a plurality of host devices. For clarity, the plurality of host devices of data communication network 102 are not shown in FIG. 2, with the exception of an edge host 220 in which, in some embodiments, network topology inference system 100 resides or is executed. As shown, the firewalls, routers, switches, host devices of data communication network 102 are communicatively coupled by physical communication links, such as wired connections 202. Wired connections 202 between network devices of data communication network 102 are described in greater detail below in conjunction with FIG. 3.

Figure 3:
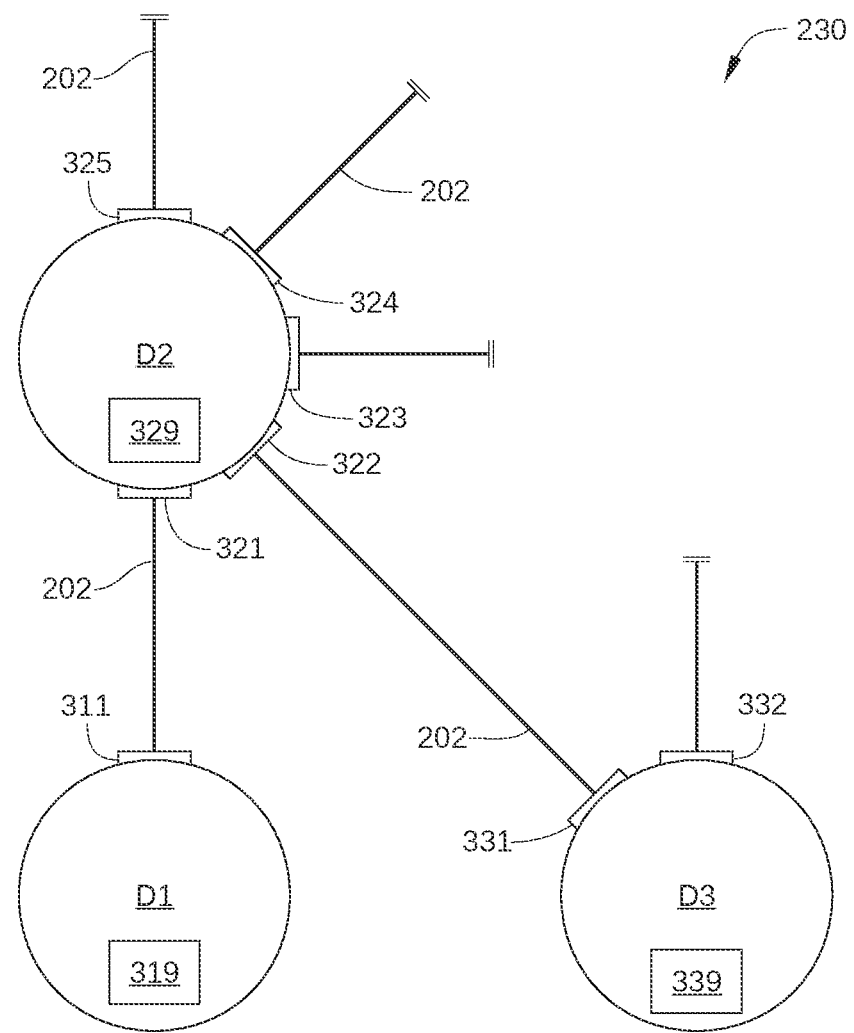
FIG. 3 is a schematic illustration of a portion of a subnet included in the data communication network of FIG. 2, according to an embodiment.

FIG. 3 is a schematic illustration of a portion 230 of subnet 213, according to an embodiment. Portion 230 includes three network devices D1-D3. Each of network devices D1-D3 can be any technically feasible network device configured to enable communication and interaction between devices on data communication network 102. Examples of such network devices include firewalls, routers, switches, and the like.

Network devices D1-D3 are connected by physical communication links 202, where a given communication link 202 is physically coupled to a particular network device at a single interface. As shown, network device D1 includes a single such network interface 311 that is in use, network device D2 includes a plurality of such network interfaces 321-325, and network device D3 includes two such network interface 331 and 332.

Having an up-to-date topology of wired connections 202 of data communication network 102 greatly facilitates proper management and operation of data communication network 102, particularly as the physical make-up of data communication network 102 changes over time. While the topology of portion 230 is clearly shown in FIG. 3, the ability for a network administrator to capture such topology and to detect changes in such topology is limited. For example, network administrators often rely on manually generated drawings, which are prone to human error, or neighborhood protocols, which can be shut down by other network operators and/or are not supported by each and every network device in data communication network 102. As a result, the network topology available to a network administrator can often be outdated or otherwise inaccurate, making debugging networking issues much more difficult and time-consuming. According to various embodiments, the current topology of wired connections between the network devices of data communication network 102 are determined without human input. Specifically, network topology engine 111 of FIG. 1 is configured to determine the current topology of wired connections based on reachability information included in each network device of data communications network 102. In the embodiment illustrated in FIG. 3, network device D1 stores or otherwise includes reachability information 319, network device D2 stores or otherwise includes reachability information 329, and network device D3 stores or otherwise includes reachability information 339. Alternatively or additionally, in some embodiments, reachability information 319, reachability information 329, and reachability information 339 can reside elsewhere in data communication network 102. Embodiments of such reachability information are described below in conjunction with FIGS. 4A-4C.

FIGS. 4A-4C schematically illustrate reachability information stored by network devices of data communication network 102, according to an embodiment. In some embodiments, reachability information for a particular network device includes a media access control (MAC) address table 410 for that particular network device; in some embodiments, reachability information for a particular network device includes an address resolution protocol (ARP) table 420 for that particular network device; and, in some embodiments, reachability information for a particular network device includes interface configuration information for that particular network device, such as a configuration information mapping 430 of a MAC addresses and/or VLAN identifiers that are associated with each interface of that particular network device.

As shown in FIG. 4A, MAC address table 410 for a particular network device includes a plurality of MAC address values 412 and, for each MAC address value 412, a port ID 413. Each different MAC address value 412 represents identifying information for a different interface in data communication network 102 to which data traffic has been sent from the particular network device. The corresponding port ID 413 indicates the specific interface of the particular network device through which the data traffic has been sent from the particular network device. In some embodiments, MAC address table 410 for a particular network device also includes, for each MAC address value 412, a virtual local area network (VLAN) ID 411 that is also associated with the MAC address value 412. Thus, by examining the contents of MAC address table 410 for a particular network device, destination MAC addresses for data traffic that has passed through that particular network device can be identified. In addition, the interface included in that particular network device through which data traffic is sent to the destination MAC address can also be identified.

As shown in FIG. 4B, ARP table 420 for a particular network device includes a plurality of Internet address values 421, MAC address values 422, VLAN IDs 423, and interface (or port) IDs 424. As shown, ARP table 420 maps IP addresses of certain network devices of data communication network 102 to the MAC addresses of those network devices. In operation, ARP table 420 is used to determine the destination MAC addresses of those network devices, as well as the VLANs and interfaces (or "ports") of the particular network device from which those network devices are reached. Thus, in ARP table 420 for a particular network device, each Internet address value 421 references a destination network device to which data traffic has been sent from the particular network device, and the corresponding MAC address value 422 is the MAC address of the destination network device. Further, the corresponding VLAN ID 423 indicates the VLAN of the destination network device and the interface ID 424 indicates the specific interface from which the destination network device is reached.

As shown in FIG. 4C, configuration information mapping 430 includes interface configuration information for a particular network device of data communication network 102. For example, in the embodiment illustrated in FIG. 4C, configuration information mapping 430 for a particular network device includes a plurality of interface IDs 431, MAC addresses 432, and VLAN IDs 433. Each interface ID 431 indicates a specific interface for the particular network device, each MAC address 432 is the MAC address of a destination network device that is reached via the corresponding interface of the particular network device, and each VLAN ID 433 indicates the VLAN of the destination network device. Thus, configuration information mapping 430 maps MAC address information and VLAN information to a specific interface of the particular network device.

In some embodiments, configuration information mapping 430 includes additional and/or alternative interface configuration information for the particular network device. For example, in some embodiments, configuration information mapping 430 includes entries that map tunnel interfaces to a specific interface of the particular network device, sub-interfaces to a specific interface of the particular network device, and/or entries that map port-channel interfaces to a specific interface of the particular network device.

In some embodiments, the reachability information included in a network device is a MAC address table 410, in some embodiments the reachability information included in a network device is an ARP table 420, in some embodiments the reachability information included in a network device is a configuration information mapping 430, and in some embodiments the reachability information included in a network device is a combination of a MAC address table 410, an ARP table 420, and/or a configuration information mapping 430. For example, in an embodiment in which a network device is a layer 2 (L2) switch, the reachability information for the network device generally includes a MAC address table 410. In an embodiment in which a network device is a layer 3 (L3) router, the reachability information for the network device generally includes an ARP table 420.

According to various embodiments, a network topology inference system, such as network topology inference system 100 of FIG. 1, determines the topology of physical communication links between devices in a network based on the above-described reachability information. One such embodiment is described below in conjunction with FIG. 5.

Figure 5:
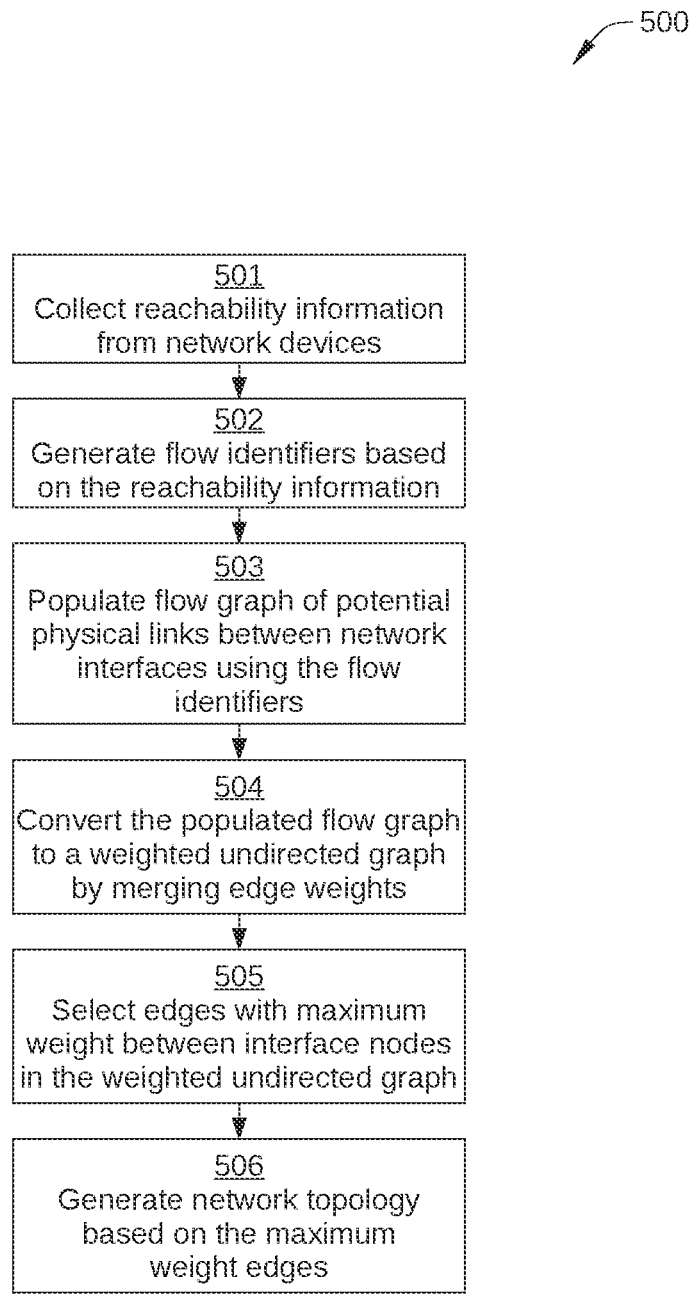
FIG. 5 sets forth a flowchart of method steps for inferring physical communication links in a data communication network, according to an embodiment.

FIG. 5 sets forth a flowchart of method steps for inferring physical communication links in a data communication network, according to an embodiment. Although the method steps are described in conjunction with network topology inference system 100 of FIGS. 1-4C, persons skilled in the art will understand that the method steps may be performed with other types of systems.

A method 500 begins at step 501, when network modeler 105 collects reachability information from the network devices of data communication network 102. In some embodiments, method 500 is performed upon start up of data communication network 102. Additionally or alternatively, in some embodiments, method 500 is performed periodically. Additionally or alternatively, in some embodiments, method 500 is performed in response to a specified user input.

It is noted that the reachability information stored in the network devices of data communication network 102 reflect recent data traffic that has occurred in data communication network 102. Consequently, a network topology that is generated based on such reachability information will represent the current physical configuration of data communication network 102.

In step 502, network topology engine 111 generates flow identifiers based on the reachability information collected in step 501. That is, a set of flow identifiers that uniquely characterize traffic flow in data communication network 102 is generated. In some embodiments, each flow identifier in the set of flow identifiers is based on a specific destination MAC address that is collected in step 501 as the reachability information from the data communication network 102. One such embodiment is described below in conjunction with FIG. 6.

Figure 7:
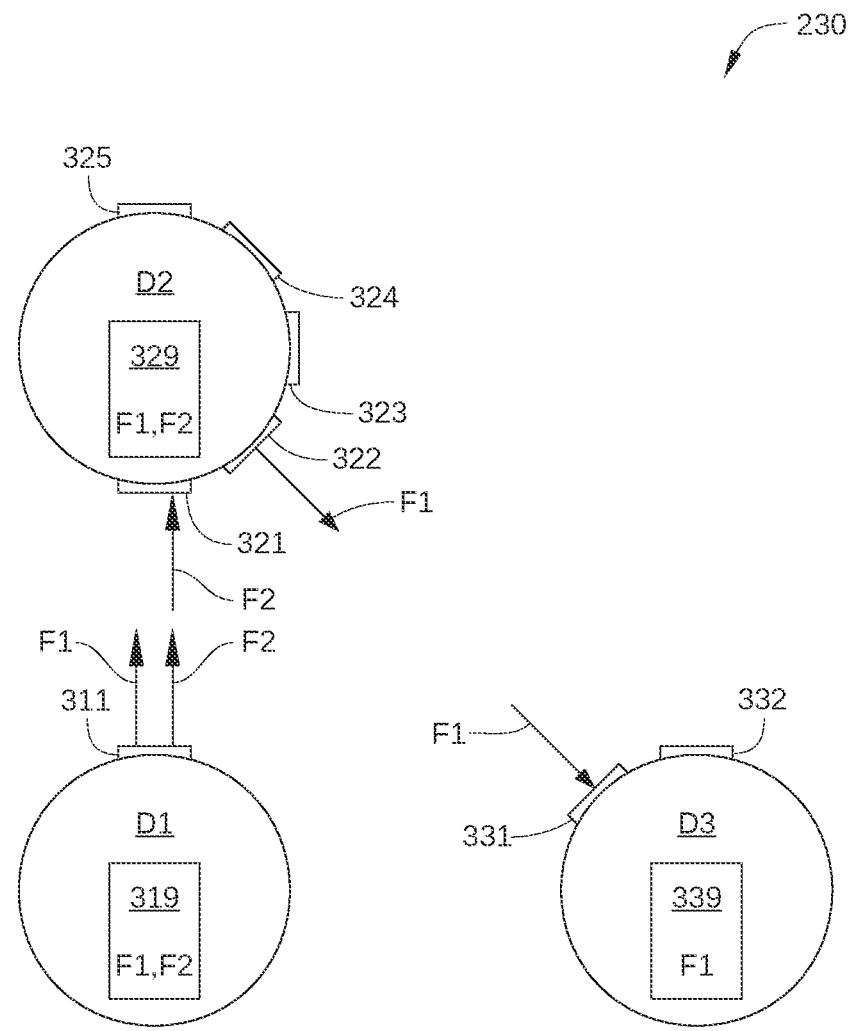
FIG. 7 schematically illustrates a portion of the subnet included in the data communication network of FIG. 2 with the known physical communication links between network devices removed and the set of flow identifiers in address location hash map shown, according to an embodiment.

FIG. 6 illustrates an address location hash map 600 of a set of flow identifiers for portion 230 of data communication network 102, according to an embodiment. Address location hash map 600 depicts flow identifiers (IDs) F1 and F2 and associated information for data traffic that flows in portion 230 of data communication network 102. FIG. 7 schematically illustrates portion 230 with the known physical communication links 202 between network devices removed and the set of flow identifiers in address location hash map 600 shown, according to an embodiment. The flow identifiers depicted in address location hash map 600 are collected for data traffic associated with network devices D1, D2, and D3 in portion 230. By way of example, in the embodiment illustrated in FIGS. 6 and 7, network devices D1 and D3 are routers with L3 interfaces, while network device D2 is a simple L2 switch with L2 interfaces. Thus, interfaces 311, 331, and 332 are L3 interfaces and interfaces 321-325 are L2 interfaces.

In the embodiment illustrated in FIG. 6, each flow identifier 601 in address location hash map 600 is based on device identification information, also referred to as reachability information, of a destination device. For example, flow ID F1 is based on, includes, and/or is equivalent to the MAC address of interface 331 of network device D3. Due to the data traffic that has occurred in portion 230, the MAC address of interface 331 resides in reachability information 319 (for example in an ARP table 420) of network device D1, reachability information 329 of network device D2 (for example in a MAC address table 410), and reachability information 339 (for example in a configuration information mapping 430) of network device D3. As a result, three instances of flow ID F1 occur in address location hash map 600 after reachability information is collected from data communication network 102 in step 501. Similarly, flow ID F2 is based on, includes, and/or is equivalent to the MAC address of interface 321 of network device D2. Thus, due to the data traffic that has occurred in portion 230, the MAC address of interface 321 resides in reachability information 319 (for example in an ARP table 420) of network device D1 and reachability information 329 (for example in a configuration information mapping 430) of network device D2. As a result, two instances of flow ID F2 occur in address location hash map 600 after reachability information is collected in step 501.

Each instance of a flow identifier 601 in address location hash map 600 is mapped to or otherwise associated with a residing network device 602 from which the MAC address is collected to generate the flow ID. Thus, because flow ID F1 is collected from network devices D1, D2, and D3, flow ID F1 is associated with three residing network devices 602 in address location hash map 600: network devices D1, D2, and D3. Similarly, because flow ID F2 is collected from network devices D1 and D2, flow ID F2 is associated with two residing network devices 602 in address location hash map 600: network devices D1 and D2.

Each flow identifier 601 in address location hash map 600 is also mapped to or otherwise associated with a particular physical interface 603 of the residing network device 602, where that particular physical interface is used to reach the destination MAC address of the destination device associated with the flow identifier 601. For example, data traffic associated with the instance of flow ID 1 residing on network device D1 ultimately reaches the destination device (interface 331 of networking device D3) via interface 311 of networking device D1. Similarly, data traffic associated with the instance of flow ID 1 residing on network device D2 reaches the destination device (interface 331 of networking device D3) via interface 322 of networking device D1.

In some embodiments, each flow identifier 601 in address location hash map 600 is also mapped to or otherwise associated with a termination indicator 604. The termination indicator 604 indicates whether termination occurs of the data traffic associated with that flow identifier 601 at the physical interface 603 of the residing network device 602. When the termination indicator 604 indicates that the data traffic associated with that instance of the flow identifier 601 terminates, the data traffic is consumed at the residing network device. In some embodiments, the termination indicator 604 for an instance of a flow identifier 601 is an entry in address location hash map 600. In other embodiments, the value of termination indicator 604 is implied based on whether the instance of the flow identifier 601 is based on a MAC address collected from a configuration information mapping 430 or a MAC address collected from a MAC address table 410. Thus, in such embodiments, the source of the MAC address collected in step 501 determines an actual or implied value of the termination indicator 604.

It is noted that the actual or implied value of termination indicator 604 can be employed to facilitate inferring physical communication links between network devices D1, D2, and D3, as set forth below.

In FIG. 7, each of the flow identifiers generated in step 502 and included in address location hash map 600 is depicted as an entry included in the reachability information of one or more of network devices D1-D3 and also as a graphical indicator of traffic flow that corresponds to one such entry. Thus, a different instance of flow ID F1 is shown included in reachability information 319 of network device D1, reachability information 329 of network device D2, and reachability information 339 of network device D3. In addition, flow ID F1 is shown as a graphical indicator of traffic flow leaving interface 311, since an instance of flow ID F1 is associated with interface 311 of network device D1. Further, flow ID F1 is also shown as a graphical indicator of traffic flow leaving interface 322, since an instance of flow ID F1 is associated with interface 322 of network device D2. Flow ID F1 is shown a third time as a graphical indicator of traffic flow terminating at interface 331, since an instance of flow ID F1 is associated with interface 331 of network device D3 and a termination indicator 604 that indicates that data traffic associated with flow ID F1 is consumed at networking device D3.

For clarity, not all data traffic that occurs in portion 230 is represented by flow identifiers 601 in FIGS. 6 and 7. Additional data traffic not represented by flow identifiers that may be present in portion 230 may include data traffic from network device D2 to network devices outside portion 230, data traffic from network device D3 to network device D1, data traffic from network device D3 to network devices outside portion 230, and the like.

As noted above, flow identifiers 601 are based on a reachability information, such as device identification information, for a destination device. In the embodiment illustrated in FIG. 6, such reachability information for each flow identifier is the MAC address of a destination interface. In some instances of data communication network 102, basing each flow identifier on the MAC address of a particular destination device provides sufficient information for tracking data traffic throughout data communication network 102. However, MAC addresses can frequently be shared by network devices. For example, there can be multiple L2 segments in a data communication network in which hosts and/or interfaces share the same MAC address. In such instances, additional information is required to uniquely track data traffic from each network device in data communication network 102. Accordingly, in some embodiments, the reachability information on which flow identifiers 601 are based can further include VLAN ID. Thus, in such embodiments, a tuple formed by the (device name, destination MAC address, VLAN) can be used to track the flow of traffic through the network.

In some embodiments, for each device $d_I$ in data communication network 102, physical interface 603 entries in address location hash map 600 are determined using a suitable procedure. Thus, for each ARP entry $a_e$ in $d_I$, the outgoing interface in $a_e$ is resolved to the appropriate physical interfaces ($p_I$) using the procedure; for each MAC entry $m_e$ in $d_I$, the outgoing interface in me is resolved to the appropriate physical interfaces ($p_I$) from information included in the MAC address table 410 using the procedure, and for each interface in $d_I$, the interface is resolved to its potential physical interfaces ($p_I$). One embodiment of such a procedure is described below in conjunction with FIG. 8.

Figure 8:
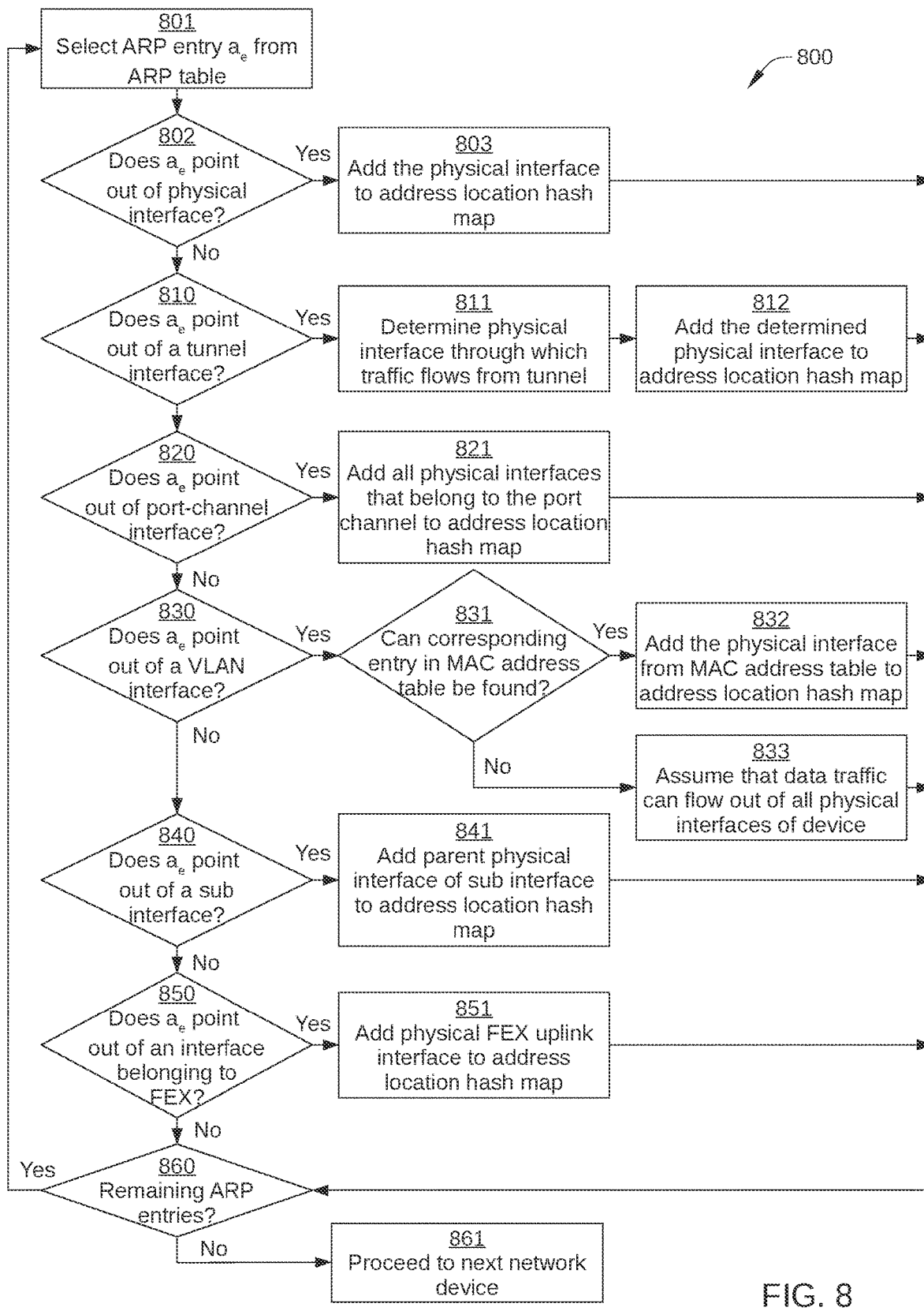
FIG. 8 sets forth a flowchart of method steps for determining entries in an address location hash map, according to an embodiment.

FIG. 8 sets forth a flowchart of method steps for determining entries in address location hash map 600, according to an embodiment. The method steps are performed for a specific network device $d_I$ in data communication network 102. To complete all entries in address location hash map 600, the method steps are performed for each network device in data communication network 102. Although the method steps are described in conjunction with network topology inference system 100 of FIG. 1-7, persons skilled in the art will understand that the method steps may be performed with other types of systems.

A method 800 begins at step 801, where network topology engine 111 selects an entry $a_e$ in ARP table 420 for the instant network device. In step 802, network topology engine 111 determines whether an ARP entry $a_e$ directly points out of physical interface $p_H$ in network device $d_I$ (where network device $d_I$ includes H physical interfaces). If yes, method 800 proceeds to step 803; if no, method 800 proceeds to step 810. In step 803, network topology engine 111 adds the physical interface $p_H$ as an entry in address location hash map 600 for ARP entry $a_e$, and method 800 proceeds to step 860.

In step 810, network topology engine 111 determines whether ARP entry $a_e$ points out of a tunnel in network device $d_I$. If yes, method 800 proceeds to step 811; if no, method 800 proceeds to step 820. In step 811, network topology engine 111 determines the physical interface that is associated with the tunnel interface and through which data traffic from the tunnel interface flows. In step 812, network topology engine 111 adds the determined physical interface as an entry in address location hash map 600 for ARP entry $a_e$, and method 800 proceeds to step 860.

In step 820, network topology engine 111 determines whether ARP entry $a_e$ points out of a port-channel interface in network device $d_I$. If yes, method 800 proceeds to step 821; if no, method 800 proceeds to step 830. In step 821, network topology engine 111 adds all physical interfaces that belong to the port channel as entries in address location hash map 600 for ARP entry $a_e$, and method 800 proceeds to step 860.

In step 830, network topology engine 111 determines whether ARP entry $a_e$ points out of a VLAN interface in network device $d_I$. If yes, method 800 proceeds to step 831; if no, method 800 proceeds to step 840. In step 831, network topology engine 111 determines whether the corresponding entry can be found in address table 410 for network device $d_I$. If yes, method 800 proceeds to step 832; if no, method 800 proceeds to step 833. In step 832, network topology engine 111 adds the physical interface from MAC address table 410 as an entry in address location hash map 600 for ARP entry $a_e$, and method 800 proceeds to step 860. In step 833, network topology engine 111 assumes that data traffic associated with ARP entry $a_e$ can flow out of all physical interfaces having that VLAN interface of network device $d_I$, and adds all physical interfaces that belong to network device $d_I$ as entries in address location hash map 600 for ARP entry $a_e$. Method 800 then proceeds to step 860.

In step 840, network topology engine 111 determines whether ARP entry $a_e$ points out of a sub-interface in network device $d_I$. If yes, method 800 proceeds to step 841; if no, method 800 proceeds to step 850. In step 841, network topology engine 111 adds the parent physical interface of the sub-interface as an entry in address location hash map 600 for ARP entry $a_e$, and method 800 proceeds to step 860.

In step 850, network topology engine 111 determines whether ARP entry $a_e$ points out of an interface that belongs to a fabric extender device (FEX) that is connected to network device $d_I$. If yes, method 800 proceeds to step 851; if no, method 800 proceeds to step 860. In step 851, network topology engine 111 adds the physical FEX uplink interface on network device $d_I$ as an entry in address location hash map 600 for ARP entry $a_e$, and method 800 proceeds to step 860.

In step 860, network topology engine 111 determines whether the physical interfaces need to be resolved for any remaining ARP entries for network device $d_I$. If yes, method 800 returns to step 801; if no, method 800 proceeds to step 861. In step 861, network topology engine 111 returns to step 801, where the next network device $d_I$ in data communication network 102 is selected.

Returning to FIG. 5, in step 503, network topology engine 111 populates a logical weighted flow graph of potential physical communication links between network interfaces of data communication network 102. Specifically, network topology engine 111 populates the logical weighted flow graph based on the flow identifiers 601 and other information included in address location hash map 600. One embodiment of such a flow graph of potential physical communication links between network interfaces is illustrated in FIG. 9.

Figure 9:
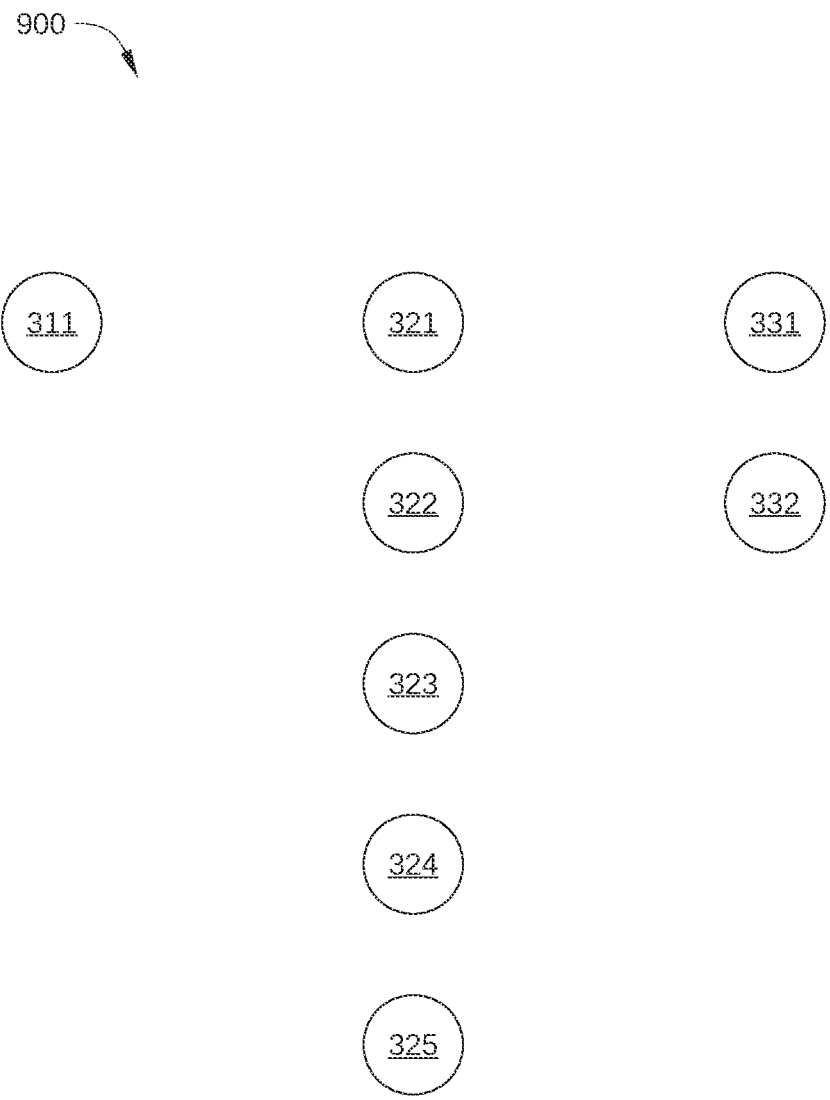
FIG. 9 schematically illustrates an unpopulated logical flow graph of device interfaces for a portion of a data communication network, according to an embodiment.

FIG. 9 schematically illustrates an unpopulated logical flow graph 900 of device interfaces for portion 230 of data communication network 102, according to an embodiment. For purposes of description, logical flow graph 900 is depicted in FIG. 9 as a two-dimensional graph. In practice, network topology engine 111 typically implements logical flow graph 900 as a virtual graph or data structure. As shown, each interface of network devices D1-D3 is represented as a node of logical flow graph 900. According to various embodiments, logical flow graph 900 is populated with directed, weighted edges between the nodes (i.e., the interfaces) of logical flow graph 900, where the weight of each such edge is incremented or decremented based on flow identifiers 601 of address location hash map 600.

Figure 10:
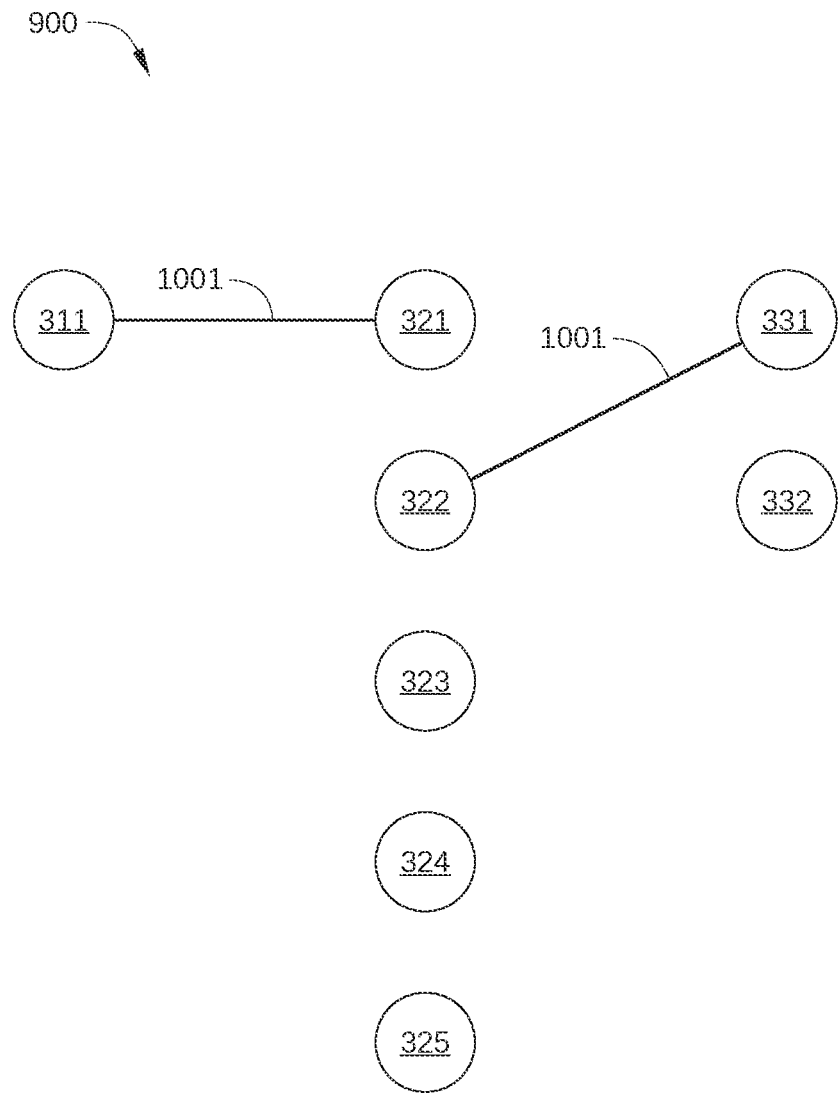
FIG. 10 schematically illustrates a logical flow graph after being populated with actual physical communication links inferred to be between network interfaces of a data communication network, according to an embodiment.

FIG. 10 schematically illustrates logical flow graph 900 after being populated with actual physical communication links inferred to be between network interfaces of data communication network 102, according to an embodiment. As shown, a graphical indicator, such as an edge 1001, is depicted in FIG. 10 for each physical communication link inferred to exist in data communications network 102. It is noted that each interface of flow graph 900 can only be coupled to a single corresponding interface by a physical communication link, since only a single physical cable can be coupled to each interface. Thus, each interface of flow graph 900 is connected to a single edge 1001 after edges with maximum weight have been selected to be the actual physical communication links between network interface. Once populated as shown, logical flow graph 900 enables the generation of a network topology. One embodiment for the populating of a logical flow graph for all of data communication network 102 is described below in steps 503-505.

Returning to FIG. 5, in step 503, network topology engine 111 populates a logical flow graph with potential physical communication links between network interfaces using the flow identifiers 601 of address location hash map 600. According to various embodiments, the logical flow graph is populated with potential physical communication links based on two assumptions. First, if the same traffic, as indicated by a particular flow identifier 601 (e.g., flow ID F1), is flowing between first and second network devices, there is potentially a physical communication link between the first and second network devices. Second, when the instance of data traffic is flowing out of a first interface I1 on the first network device to a second interface I2 on the second device, unless that data traffic is consumed on the second network device, a physical communication link cannot exist between I1 and I2. The second assumption is based on the fact that there cannot be simple L2 loops in data communication network 102. For example, when the ARP entry associated with a particular flow identifier (e.g., flow ID F1) in the first device points out of I1 and the ARP entry associated with that particular flow identifier in the second device points out of I2, then there cannot be a link between I1 and I2, since that would create an L2 loop between the first and second devices. This second assumption is applied in the algorithm outlined below.

Figure 11:
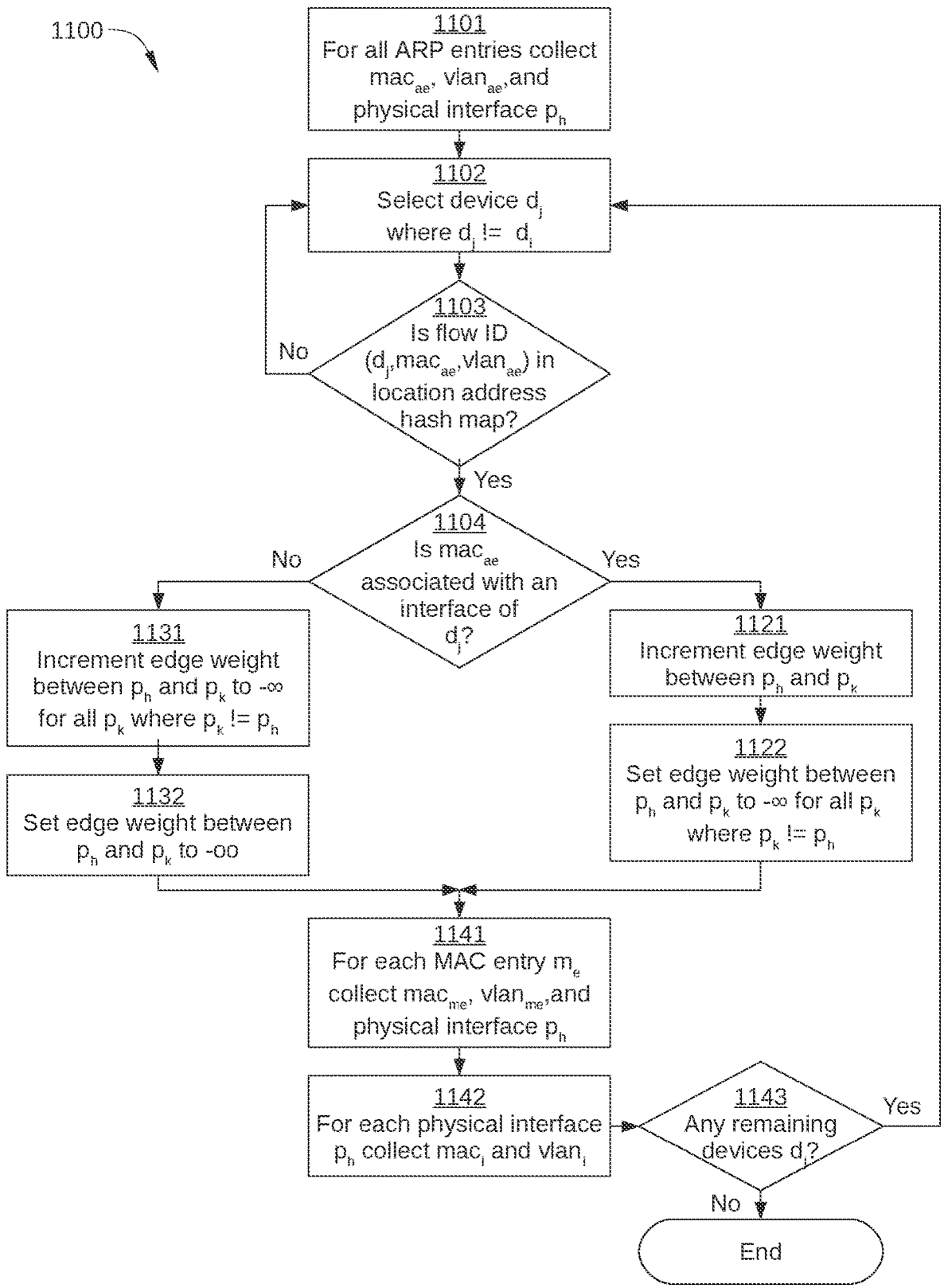
FIG. 11 sets forth a flowchart of method steps for populating a logical flow graph of network interface nodes with weighted, directed edges, according to an embodiment.

FIG. 11 sets forth a flowchart of method steps for populating a logical flow graph of network interface nodes with weighted, directed edges, according to an embodiment. The method steps are performed for a specific network device $d_I$ in data communication network 102. To complete all edges in a logical flow graph for data communication network 102, the method steps are performed for each network device in data communication network 102. Although the method steps are described in conjunction with network topology inference system 100 of FIG. 1-10, persons skilled in the art will understand that the method steps may be performed with other types of systems.

A method 1100 begins at step 1101, where network topology engine 111 collects reachability information for all ARP entries for network device $d_I$. In some embodiments, network topology engine 111 collects a destination MAC address $mac_{ae}$, the VLAN ID $vlan_{ae}$, and the physical interface $p_h$ for each ARP entry in step 1101. In step 1102, network topology engine 111 selects a network device $d_j$ from among the network device of data communication network 102, where network device $d_j$ is not the current network device $d_I$. Thus, $d_j$ != $d_I$. In step 1103, network topology engine 111 determines whether a particular flow ID that includes $mac_{ae}$ and $vlan_{ae}$ and is associated with the currently selected network device $d_j$ is included in address location hash map 600. For example, in an embodiment, network topology engine 111 determines whether a flow identifier ($d_j$, $mac_{ae}$, $vlan_{ae}$) is present in address location hash map 600. If yes, method 1100 proceeds to step 1104; if no, method 1100 returns to step 2201. In step 1104, network topology engine 111 determines whether $mac_{ae}$ is associated with an interface of $d_j$. If yes, method 1100 proceeds to step 1121; if no, method 1100 proceeds to step 1131.

In step 1121, network topology engine 111 increments the edge weight between interfaces $p_h$ and $p_k$ in the logical flow graph. In step 1122, for all interfaces $p_k$ (where $p_k$ != $p_j$), network topology engine 111 sets the edge weight between each interface $p_h$ and $p_k$ in the logical flow graph to $-\infty$. Method 1100 then proceeds to step 1141.

In step 1131, network topology engine 111 increments the edge weight between interfaces $p_h$ and $p_k$ in the logical flow graph. In step 1132, for all interfaces $p_k$ (where $p_k$ != $p_h$), network topology engine 111 sets the edge weight between each interface $p_h$ and $p_k$ to $-\infty$ in the logical flow graph. Method 1100 then proceeds to step 1141.

In step 1141, network topology engine 111 collects reachability information for all MAC address entries for network device $d_f$. In some embodiments, in step 1141 network topology engine 111 collects a destination MAC address $mac_{me}$, the VLAN ID $vlan_{me}$, and the physical interface $p_h$ for each MAC address entry. In step 1142, network topology engine 111 collects reachability information for each physical interface $p_h$ for network device $d_f$. In some embodiments, network topology engine 111 collects an interface MAC address $mac_i$ and the VLAN ID $vlan_i$. Method 1100 then proceeds to step 1143. In step 1143, network topology engine 111 determines whether there are any remaining network devices $d_j$ to be checked for flow identifier ($d_f$, $mac_{ae}$, $vlan_{ae}$). If yes, method 1100 returns back to step 1102; if no, method 1100 ends. As a result, the logical flow graph of the device interfaces of data communication network 102 is populated with directed, weighted edges, where each directed edge indicates a potential physical communication link between two interfaces.

Returning to FIG. 5, in step 504, network topology engine 111 converts populated logical flow graph to an undirected, weighted graph. When a wired connection is established between two interfaces, data traffic can flow in both directions, and a bidirectional connection is formed. That is, physical communication links in data communication network 102 are undirected in nature. Consequently, the weighted directed graph generated via method 1100 is converted into a weighted undirected graph by adding the weights of edges between the same two interfaces. As a result, the weight of an edge in the newly generated undirected graph between two interfaces represents the total data traffic that flows (in both directions) between the two interfaces.

In step 505, network topology engine 111 selects edges with maximum weight between each pair of interface nodes that is connected by an edge. In this way, from all of the potential physical communications links that can exist based on the reachability information available in data communication network 102, the highest probability link between two interface nodes is selected. Further, to eliminate false positives, in some embodiments, an edge is chosen between interfaces only when that edge is the highest weighted edge flowing out of both nodes. Thus, in such embodiments, a statistical consensus is determined between data traffic flowing out of each interface node associated with a particular highest weighted edge. In this way, the highest weighted edge really is a physical communications link and not a false positive. One such embodiment for selecting edges with maximum weight is described below in conjunction with FIG. 12.

Figure 12:
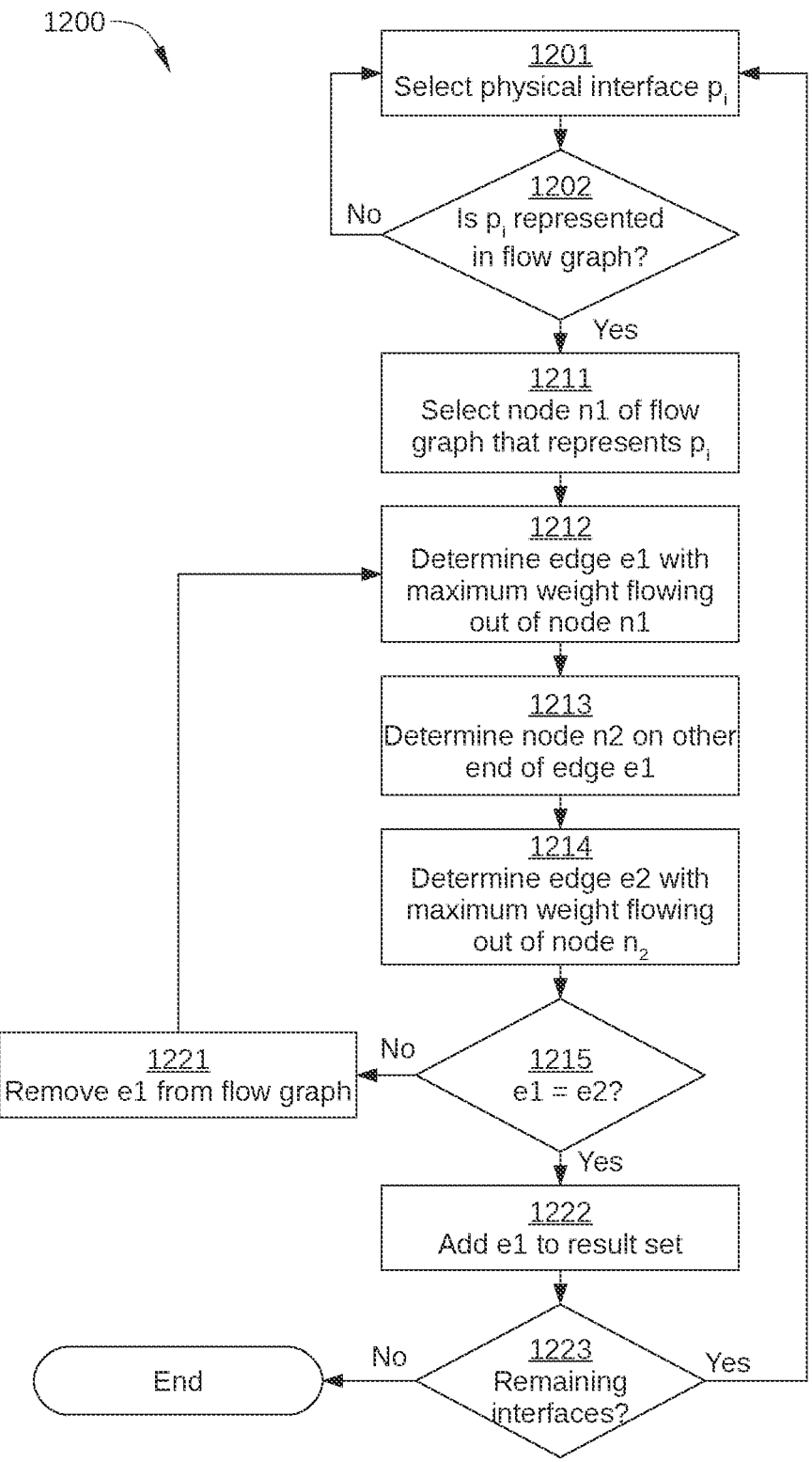
FIG. 12 sets forth a flowchart of method steps for selecting edges with maximum weight from a logical flow graph of network interface nodes, according to an embodiment.

FIG. 12 sets forth a flowchart of method steps for selecting edges with maximum weight from a logical flow graph of network interface nodes, according to an embodiment. The method steps are performed for a logical flow graph of network interface nodes that has been populated with weighted edges between some or all of the interface nodes. Although the method steps are described in conjunction with network topology inference system 100 of FIG. 1-11, persons skilled in the art will understand that the method steps may be performed with other types of systems.

A method 1200 begins at step 1201, where network topology engine 111 selects an interface $p_i$ from all of the interfaces included in data communications network 102. In step 1202, network topology engine 111 determines whether interface $p_i$ is represented in the logical flow graph. It is noted that an interface $p_i$ is represented in the logical flow graph as an interface node when there is at least one instance of a flow identifier associated with the interface $p_i$ in address location hash map 600. If yes, method 1200 proceeds to step 1211; if no, method 1200 returns to step 1201, where another network interface $p_i$ is selected.

In step 1211, network topology engine 111 selects the node n1 in the logical flow graph that represents $p_i$. In step 1212, network topology engine 111 determines the edge e1 associated with node n1 that has the maximum weight flowing out of node n1, i.e., the edge with the largest number of flow identifiers pointing from node n1 to a single other node. In step 1213, network topology engine 111 determines the node n2 that is disposed on the other end of edge e1. In step 1214, network topology engine 111 determines the edge e2 that has the maximum weight flowing out of node n2, i.e., the edge with the largest number of flow identifiers pointing from node n2 to a single other node. In step 1215, network topology engine 111 determines whether the endpoints of edge e1 and the endpoints of edge e2 are the same. If no, method 1200 proceeds to step 1221; if yes, method 1200 proceeds to step 1222.

Step 1221 is performed in response to a lack of consensus regarding edge e1 having maximum weight between nodes n1 and n2. Thus, in step 1221, network topology engine 111 removes edge e1 from the logical flow graph. Step 1222 is performed in response to a consensus being confirmed regarding edge e1 having maximum weight between nodes n1 and n2. Thus, in step 1222, network topology engine 111 adds edge e1 to the final flow graph used to generate a physical topology of data communication network 102. In addition, network topology engine 111 removes nodes n1 and n2 from the logical flow graph, since no other physical communication links can be associated with nodes n1 and n2. Further, network topology engine 111 removes potential links that are no longer possible when edge e1 is determined to be an actual physical communication link. For example, network topology engine 111 removes all edges out of nodes n1 and all edges out of n2. In step 1223, network topology engine 111 determines whether there are any remaining interfaces pi to be examined. If yes, method 1200 returns to step 1201. If no, method 1200 terminates.

Returning to FIG. 5, in step 506, network topology engine 111 generates a network topology based on the maximum weight edges determined in step 505. Thus, network topology engine 111 constructs a network topology which conforms to actual data traffic flow in data communication network 102 without monitoring actual data traffic within data communication network 102.

WAN Cloud Inference

Many organizations that rely on computer networks frequently have a plurality of networks. In addition to multiple data centers, a single organization can have branch offices and regional sites, and portions of certain networks deployed in a public cloud. Consequently, the networks of most organizations are usually fragmented, and communicate with each other using a public wide area network (WAN) that is most commonly provided by Internet service providers (ISPs). Because an organization with a network that is fragmented in a public cloud does not have any visibility into the these ISP-provided networks, modeling or otherwise understanding the behavior of the entire network is difficult or impossible. As a result, monitoring end-to-end behavior of the packet flows in such a fragmented network is not available to a network administrator.

According to various embodiments, network topology inference system 100 enables a network administrator to monitor how packets flow from one portion of a network, through a WAN cloud, and into another portion of the network. Thus, even though a network is fragmented across a public WAN, the network administrator can monitor packets flowing through some representation of this WAN cloud and into his known networks. In such embodiments, for a network having a known topology that is fragmented across a WAN, interfaces within the known topology that connect to the WAN are specified. In addition, how these interface use the WAN (e.g., via L3 VPN or L2 VPN) are also specified. Based on such information, network topology inference system 100 generates representative WAN cloud devices and models the behavior of the representative WAN cloud devices. In addition, when a network topology is displayed to the user, these additional representative WAN cloud devices are included in the user interface and are connected on the interfaces specified by the user to connect to the WAN. Consequently, when a user does a search for particular data traffic between two network fragments, the user sees the data traffic leaving the known topology of one network fragment, pass into the WAN via the representative WAN cloud devices, then leave the WAN to go into the known topology of another network fragment. One such embodiment is described below in conjunction with FIG. 13.

Figure 13:
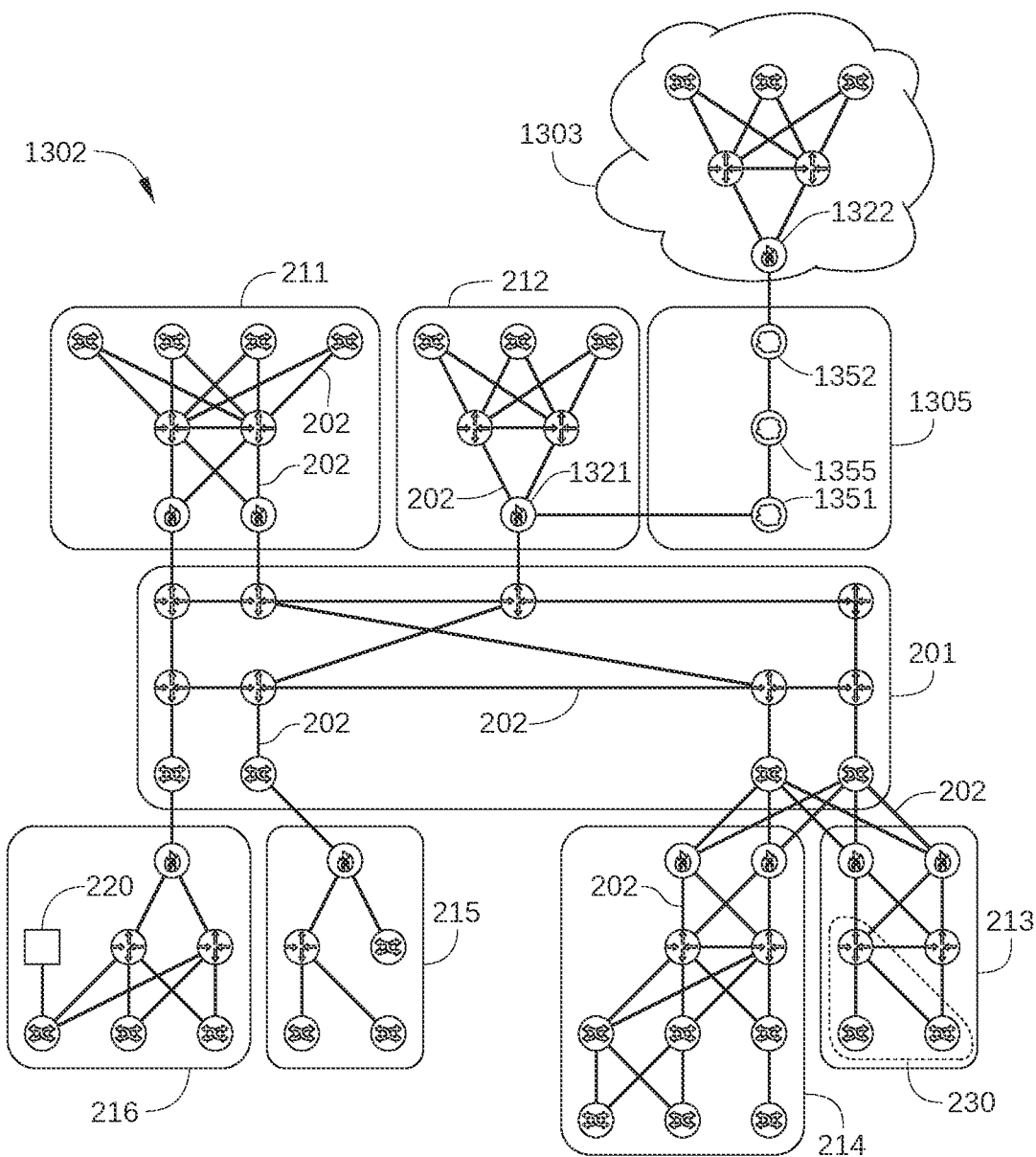
FIG. 13 is a schematic illustration of a data communication network2, according to an embodiment.

FIG. 13 is a schematic illustration of data communication network 1302, according to an embodiment. Data communication network 1302 is a computer network that is substantially similar to data communication network 102 of FIG. 2, except that data communication network 1302 further includes a remote subnet 1303. Remote subnet 1303 is implemented in a public cloud computing environment, such as Amazon Web Services or Google Cloud Platform, and is communicatively coupled to data communication network 1302 via a WAN 1305, such as the Internet.

According to various embodiments, when a search for particular data traffic is performed by an administrator of data communication network 1302 from an on-premise network (e.g., subnet 211) to remote subnet 1303, the traffic flows from the on-premise network, through WAN 1305, and into remote subnet 1303. In some embodiments, network modeler 105 or some other analysis module of network topology inference system 100 models and displays such traffic flows based on a previously generated model of WAN 1305. A method for generating such a model is described below in conjunction with FIG. 14.

Figure 14:
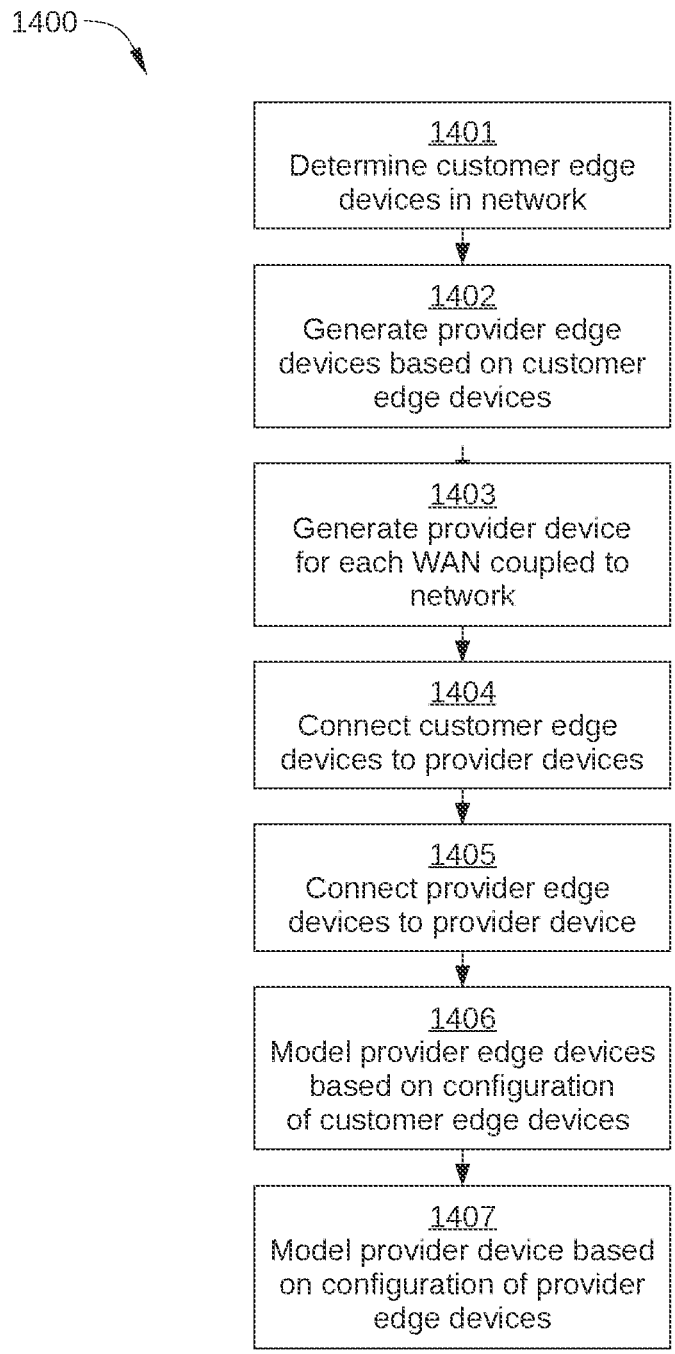
FIG. 14 sets forth a flowchart of method steps for inferring physical communication links in a data communication network, according to an embodiment.

FIG. 14 sets forth a flowchart of method steps for inferring physical communication links in a data communication network, according to an embodiment. Although the method steps are described in conjunction with network topology inference system 100 of FIGS. 1-13, persons skilled in the art will understand that the method steps may be performed with other types of systems.

A method 1400 begins at step 1401, when network modeler 105 determines customer edge devices, for example by identifying all network devices in data communication network 1302 that are at an edge of data communication network 1302 and can therefore connect to WAN 1305. In some embodiments, such customer edge devices are specified by a network user. Alternatively or additionally, network modeler 105 can infer which network devices in data communication network are edge devices based on the contents of certain reachability information associated with the edge devices. In the embodiment illustrated in FIG. 13, edge devices of data communication network 1302 include a firewall 1321 in subnet 1303 and a firewall 1322 in remote subnet 1303. Thus, data communication network 1302 is fragmented across WAN 1305.

In embodiments in which network modeler 105 determines customer edge (CE) devices based on user input, such input may include additional information. In some embodiments, the user input indicates which interface of a specific CE device connects to WAN 1305. Alternatively or additionally, in some embodiments, the user input indicates what service is provided by or available from WAN 1305, e.g., L2VPN, L3VPN, or point-to-point service. Alternatively or additionally, in some embodiments, the user input indicates a specific name or other identifier for WAN 1305 and/or other administrative information.

In step 1402, network modeler 105 generates provider edge (PE) devices. Generally, network modeler 105 generates one PE device for each CE device interface that is indicated to connect to WAN 1305. Conceptually, each PE device is a representation of what is present on the other side of the edge link associated with a particular CE device, since state, configuration, or other information generally cannot be collected from network devices in WAN 1305. Instead, each PE device is assumed to exist and connect to a corresponding CE device. In the embodiment illustrated in FIG. 13, PE device 1351 is added to the network topology of data communication network 1302 and connected to firewall 1321 and PE device 1352 is added to the network topology of data communication network 1302 and connected to firewall 1322. In this way, network modeler 105 captures the fact that multiple edges of data communication network 1302 are connected with each other via WAN 1305.

In the embodiment illustrated in FIG. 13, data communication network 1302 is connected to a single ISP. In other embodiments, data communication network 1302 can include multiple exit points that each connect through a different ISP, for example for redundancy. In such embodiments, a user can specify which CE devices are coupled to which ISPs, and each ISP is subsequently modeled as a different WAN. For clarity of description, method 1400 is described in terms of data communication network 1302 being connected to a single WAN.

In step 1403, network modeler 105 generates a provider (P) device for each WAN coupled to data communication network 1302. Thus, in the embodiment illustrated in FIG. 13, network modeler 105 generates a P device 1355 that connects PE devices 1351 and 1352. Similar to PE devices 1351 and 1352, P device 1355 is an abstract representation of a portion of WAN 1305. Specifically, P device 1355 represents the entire network of WAN 1305 as a single network device.

In step 1404, network modeler 105 connects the CE devices (firewall 1321 and firewall 1322) to corresponding PE devices (PE devices 1351 and 1352). In so doing, network modeler 105 creates an interface on PE device 1351 from which data traffic flows to and from firewall 1321 and an interface on PE device 1352 from which data traffic flows to and from firewall 1322.

In step 1405, network modeler 105 connects PE devices 1351 and 1352 to P device 1355. In so doing, network modeler 105 creates an interface on PE device 1351 from which data traffic flows to and from P device 1355 and an interface on PE device 1352 from which data traffic flows to and from P device 1355.

In step 1406, network modeler 105 models PE devices 1351 and 1352, based on CE device configuration information available to network modeler 105. One embodiment of a method of modeling a PE device is described below in conjunction with FIG. 15.

Figure 15:
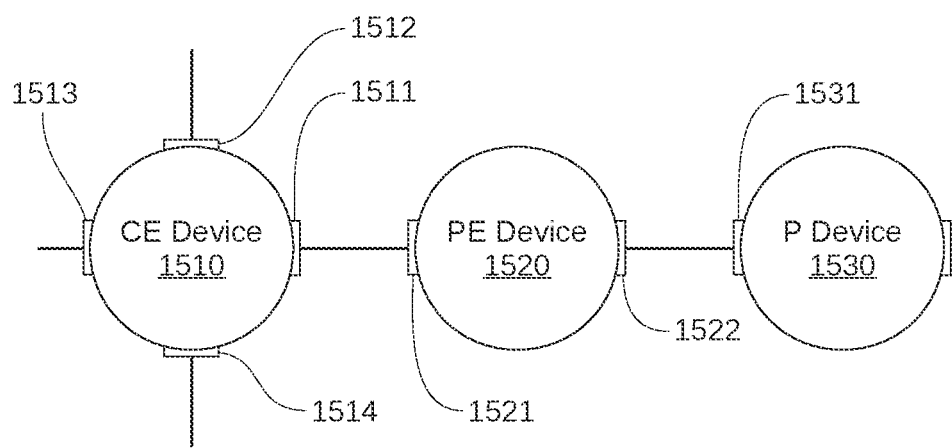
FIG. 15 schematically illustrates a customer edge device, a provider edge device communicatively coupled to the device, and a provider device communicatively coupled to the provider edge device, according to an embodiment.

FIG. 15 schematically illustrates a CE device 1510, a PE device 1520 communicatively coupled to CE device 1510, and a P device 1530 communicatively coupled to PE device 1520, according to an embodiment. In the embodiment, CE device 1510 include four interfaces 1511-1514 and PE device 1520 include two interfaces 1521 and 1522. In other embodiments, CE device 1510 can include more or fewer than four interfaces, and PE device 1520 can include more than two interfaces. In some embodiments, the modeling of PE device 1520 is based on a routing table of CE device 1510. One embodiment of a routing table of CE device 1510 is described below in conjunction with FIG. 16.

FIG. 16 is a schematic illustration of a routing table 1600 of CE device 1510, according to an embodiment. As shown, routing table 1600 includes an Internet protocol (IP) address range 1601 for each of interfaces 1511-1514. Thus, based on the IP address of a packet received by CE device 1510 and information included in routing table 1600, CE device 1510 routes the packet out of a particular interface. In the embodiment illustrated in FIG. 16, interfaces 1512-1514 are each communicatively coupled to subnets within data communication network 1302, while interface 1511 is communicatively coupled to PE device 1520.

Based on the entries in routing table 1600 and the connectivity of CE device 1520 shown in FIG. 15, CE device 1510 routes specified IP address ranges of packets to subnets within data communication network 1302, out of interfaces 1512-1513, and routes a remaining specified IP address range (or ranges) of packets to P device 1530 out of interface 1511. In light of this behavior, network modeler 105 models PE device 1520 to route packets, via interface 1521, to CE device 1510 for the subnets connected on interfaces 1512-1513, since CE device 1510 is configured to then route such packets accordingly within data communication network 1302. Network modeler 105 further models PE device 1520 to route packets, via interface 1522, for any remaining IP address ranges to P device 1530. In some embodiments, the above-described modeling of PE device 1520 is implemented as a routing table. One such embodiment is described below in conjunction with FIG. 17.

FIG. 17 is a schematic illustration of a routing table 1700 of PE device 1520, according to an embodiment. As shown, routing table 1700 includes an Internet protocol (IP) address range 1701 for each of interfaces 1521 and 1522. Thus, based on the IP address of a packet received by PE device 1520 and information included in routing table 1700, PE device 1520 routes packets for certain IP address ranges to CE device 1520 out of interface 1521 and packets for certain other IP address ranges to PE device 1530 out of interface 1522. Specifically, packets for IP address ranges that CE device 1520 is programmed to route within data communication network 1302 are sent to CE device 1520 via interface 1521, while packets for any remaining IP address ranges are sent to P device 1530 via interface 1522.

In some embodiments, for example in a network in an L3VPM scenario, network modeler 105 is configured to model each PE device associated with data communication network 1302 according to the following three rules: 1) For each L3 route in the CE device that is connected to the PE device being modeled, when the route points to the PE device, the route is ignored by the PE device being modeled; 2) For each L3 route in the CE device that is connected to the PE device being modeled, when the route does not point to the PE device, the route is copied over to the PE device, and traffic associated with the route is sent by the PE device being modeled to the CE device; 3) All remaining traffic is sent by the PE device to the connected P device, for example via a default route.

Returning to FIG. 14, in step 1407, network modeler 105 models P device 1355 using similar logic to that employed in modeling PE device 1530. That is, the modeling of P device 1355 is based on the PE device configuration information modeled for any PE devices connected to P device 1355. In some embodiments, network modeler 105 is configured to model each P device associated with data communication network 1302 according to the following rule: For each PE that is connected to the P device being modeled, each route in the PE device that points out of the PE device is copied over to the P device, and therefore traffic associated with the route is sent by the P device being modeled to the PE device. For example, in the embodiment illustrated in FIG. 15, P device 1530 examines the connected PE device 1520 and detects four routes. Out of the four routes, there are three routes that do not point towards P device 1530 and one route that does. Therefore, P device 1530 copies over the three routes that point away from PE device 1520 and sends that traffic to PE device 1520. A resultant routing table for P device 1530 after being modeled by network modeler 105 is illustrated in FIG. 18.

Figure 18:
FIG. 18 is a schematic illustration of a routing table of the provider device of FIG. 15, according to an embodiment.

FIG. 18 is a schematic illustration of a routing table 1800 of P device 1530, according to an embodiment. As shown, routing table 1800 includes an Internet protocol (IP) address range 1801 for interface 1531. Due to the modeling of the PE devices and P devices of WAN 1305, routing table 1800 reflects traffic flow to certain subnets of data communication network 1302 that are handled by the CE device(s) that connect to PE devices (e.g., PE device 1520). Thus, the abstract PE devices and P devices generated by network modeler 105 are programmed to send such traffic to the appropriate CE devices of data communication network 1302.

It is noted that the example embodiments described above are simplified. In practice, data communication network 1302 often includes a plurality of CE devices. As a result, the behavior of the modeled PE devices and P devices becomes more complex, as different routes are fed into the modeled PE devices and P devices from different edges of data communication network 1302. However, after all PE devices and P devices are appropriately programmed, each PE device and P device knows which subnets are behind which of the CE devices of data communication network 1302, and therefore route traffic to the appropriate CE device. Thus, a complete model of the behavior of data communication network 1302 can be generated, even though data communication network 1302 is fragmented across one or more WANs.

Host Inference

Having an up-to-date knowledge of where active end hosts are located in a data communication network can be important information for a network administrator to have. For example, a network administrator can employ such information to validate whether an end host is correctly located, which in turn facilitates design of micro-segmentation rules in the network. In addition, end host location information can provide insight into what traffic is currently flowing in the network without actually monitoring network traffic with agents, which can facilitate capacity planning of the data communication network. For example, if too many hosts are communicating from one particular interface in the network, more bandwidth can be provided to that particular interface, or some of the hosts can be relocated to a different interface. While in a software-defined network, a network controller already knows the locations of all hosts in the network, in a physical data communication network, such information is generally not stored in any central database.

According to various embodiments, network topology inference system 100 determines the locations of end hosts based on reachability information of network devices, such as entries in ARP tables and MAC address tables. It is noted that ARP table entries and MAC address table entries give information only about the active hosts in the network. As a result, the embodiments described here infer the locations of hosts that are actively communicating in the network.

In some embodiments, network topology inference system 100 generates a located hosts map. In such embodiments, the located hosts map includes the hosts in a data communication network and the known location of each host, for example via a tuple: {Host IP address, Host MAC Address, Interface (to which the hosts connects in the network)}. In the embodiments, network topology inference system 100 generates the located hosts map for a data communication network by looping through all the ARP entries in the network and determining what IP addresses are present in the network. When the ARP entry is directly connected to an unknown device, it is assumed that a host associated with the ARP entry is directly connected to that network device. When the ARP entry is not directly connected to an unknown device, network topology inference system 100 walks across a few devices to resolve where the host is actually connected. The IP addresses associated with the additional resolution procedure are stored in a temporary map referred to herein as a needs resolution map. Once all ARP entries in the network are examined for connection to known and unknown devices, network topology inference system 100 loops through the needs resolution map, walking across all the devices until an end point for that particular IP is reached. One such embodiment for generating a located hosts map in this way is described below in conjunction with FIG. 19.

Figure 19:
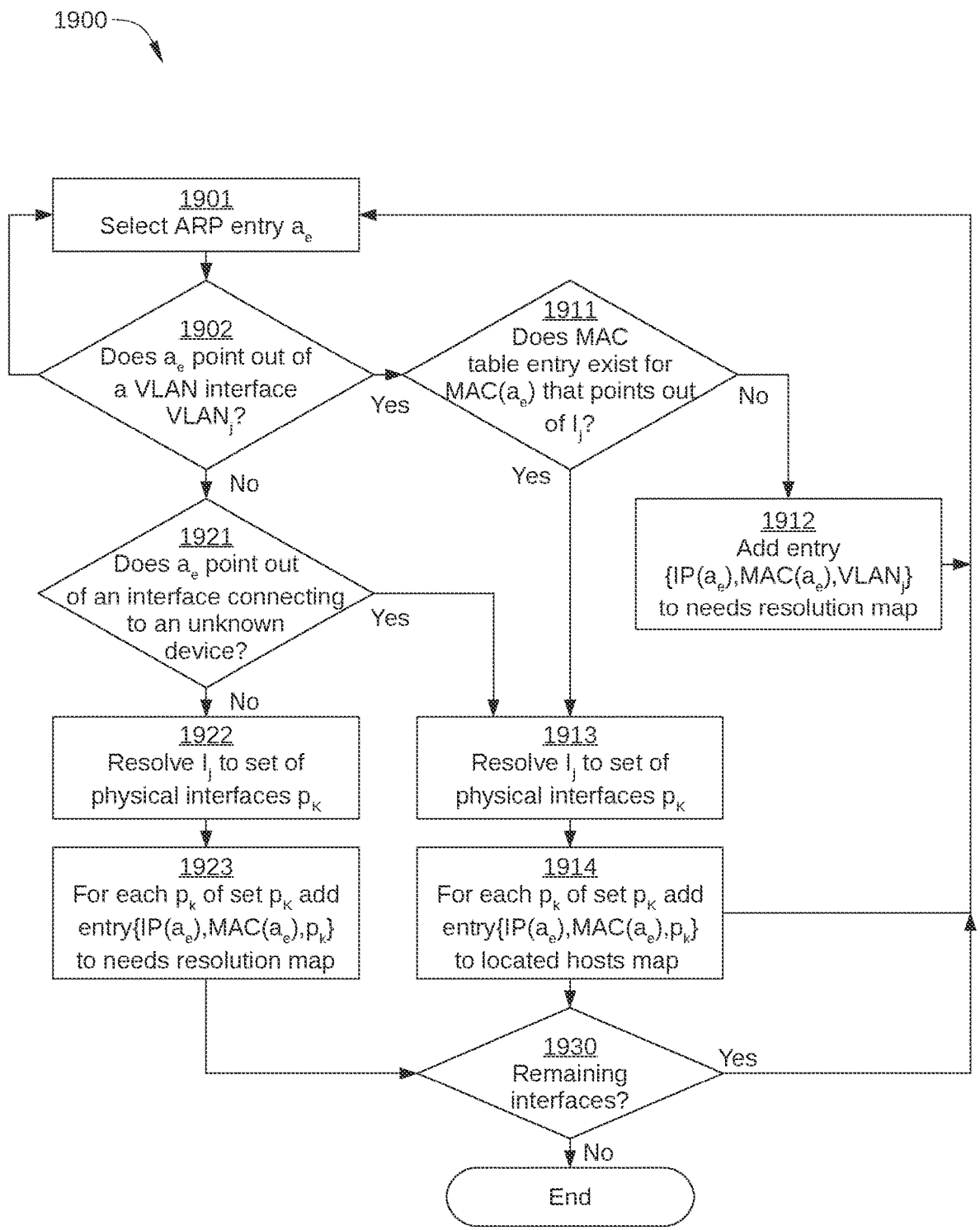
FIG. 19 sets forth a flowchart of method steps for inferring host locations in a data communication network, according to an embodiment.

FIG. 19 sets forth a flowchart of method steps for inferring host locations in a data communication network, according to an embodiment. The method steps are performed for a specific network device $d_I$ in data communication network 102. To complete determining the location of all active hosts within data communication network 102, the method steps are performed for each network device in data communication network 102. Although the method steps are described in conjunction with network topology inference system 100 of FIGS. 1-18, persons skilled in the art will understand that the method steps may be performed with other types of systems.

A method 1900 begins at step 1901, when network modeler 105 selects an ARP entry $a_e$ from ARP table 420 for the instant network device $d_I$. In step 1902, network topology engine 111 determines whether the selected ARP entry $a_e$ directly points out of a VLAN interface $VLAN_j$ in network device $d_I$, where network device $d_I$ includes J interfaces. If yes, method 1900 proceeds to step 1911; if no, method 1900 proceeds to step 1921.

In step 1911, network modeler 105 determines whether a MAC table entry exists for the MAC address value $MAC(a_e)$ for the ARP entry $a_e$ selected in step 1901. If the MAC table entry does exist, network modeler 105 further determines whether the MAC table entry points out of an interface $I_j$. If no, method 1900 proceeds to step 1912; if yes, method 1900 proceeds to step 1923. In step 1912, network modeler 105 adds the entry $\{IP(a_e), MAC(a_e), VLAN_j\}$ to the needs resolution map, and method 1900 returns to step 1901 for the selection of another ARP entry $a_e$. In step 1913, network modeler 105 resolves interface $I_j$ to a set of physical interfaces $p_K$ (where interface $I_j$ is associated with K physical interfaces). In step 1913, network modeler 105 resolves interface $I_j$ to a set of physical interfaces $p_k$ using any suitable algorithm for resolving physical interfaces from a virtual interface. One such algorithm is described below. In step 1914, network modeler 105 adds an entry for each physical interface $p_k$ of the set of physical interfaces $p_K$ to a located hosts map. For example, in an embodiment, network modeler 105 adds the entry $\{IP(a_e), MAC(a_e), p_k\}$ to the located hosts map. Method 1900 then proceeds to step 1930.

In step 1921, network modeler 105 determines whether ARP entry $a_e$ points out of an interface connecting to a known or an unknown device. If yes, method 1900 proceeds to step 1913, and entries are added to the located hosts map as set forth in steps 1913 and 1914. If no, method 1900 proceeds to step 1922. In step 1922, network modeler 105 resolves interface $I_j$ to set of physical interfaces $p_K$ using any suitable algorithm for resolving physical interfaces from a virtual interface. One such algorithm is described below. In step 1923, network modeler 105 adds an entry for each physical interface $p_k$ of the set of physical interfaces $p_K$ to the needs resolution map. For example, in an embodiment, network modeler 105 adds the entry $\{IP(a_e), MAC(a_e), p_k\}$ to the needs resolution map. Method 1900 then proceeds to step 1930.

In step 1930, network modeler 105 determines whether there are any remaining ARP entries $a_e$ for network device $d_I$. If yes, method 1900 returns to step 1901; if no, method 1900 terminates for the current network device $d_I$.

In steps 1913 and 1922 of method 1900, an algorithm for resolving physical interfaces from a virtual interface is referenced. Such an algorithm can be applied to each ARP entry $a_e$ included in the needs resolution map generated by method 1900. In some embodiments, when an ARP entry $a_e$ directly points out of a physical interface $p_I$, the algorithm returns $p_i$ as the physical interface. In some embodiments, when an ARP entry $a_e$ points out of a tunnel interface, the algorithm returns the physical interface through which traffic flows out of the tunnel interface as the physical interface. In some embodiments, when an ARP entry $a_e$ points out of a sub-interface, the algorithm returns the parent physical interface as the physical interface. In some embodiments, when an ARP entry $a_e$ points out of a port-channel interface, the algorithm returns all the interfaces that belong to or are otherwise associated with the port channel as the physical interface. In some embodiments, when an ARP entry $a_e$ points out of an interface that belongs to an FEX, the algorithm returns the physical FEX uplink interface as the physical interface.

In method 1900, a needs resolution map is populated with IP addresses that have not been resolved to a host device. For example, in some embodiments, the needs resolution map is populated with tuples: $\{IP_I, MAC_I, I_I\}$. In such embodiments, when $I_I$ represents a physical interface $p_I$, that physical interface $p_I$, is added to a list of physical interfaces to be resolved to a host device. When $I_I$ is a VLAN interface, that VLAN interface is resolved to the physical interfaces associated that VLAN interface, and each such physical interface is added to the list of physical interfaces to be resolved to a host device.

In some embodiments, an algorithm for resolving such a list of physical interfaces to respective host devices is employed to complete the located host map. In such embodiments, for each physical interface in the list of physical interfaces to be resolved to a host device, such an algorithm walks down the tree of connected devices to a point where the device connects to an unknown device. When a device connects to an unknown device, the edge of the network has been reached. Consequently, the unknown device is determined to be a host and is added to the located hosts map. An embodiment of one such algorithm is described below in conjunction with FIG. 20.

Figure 20:
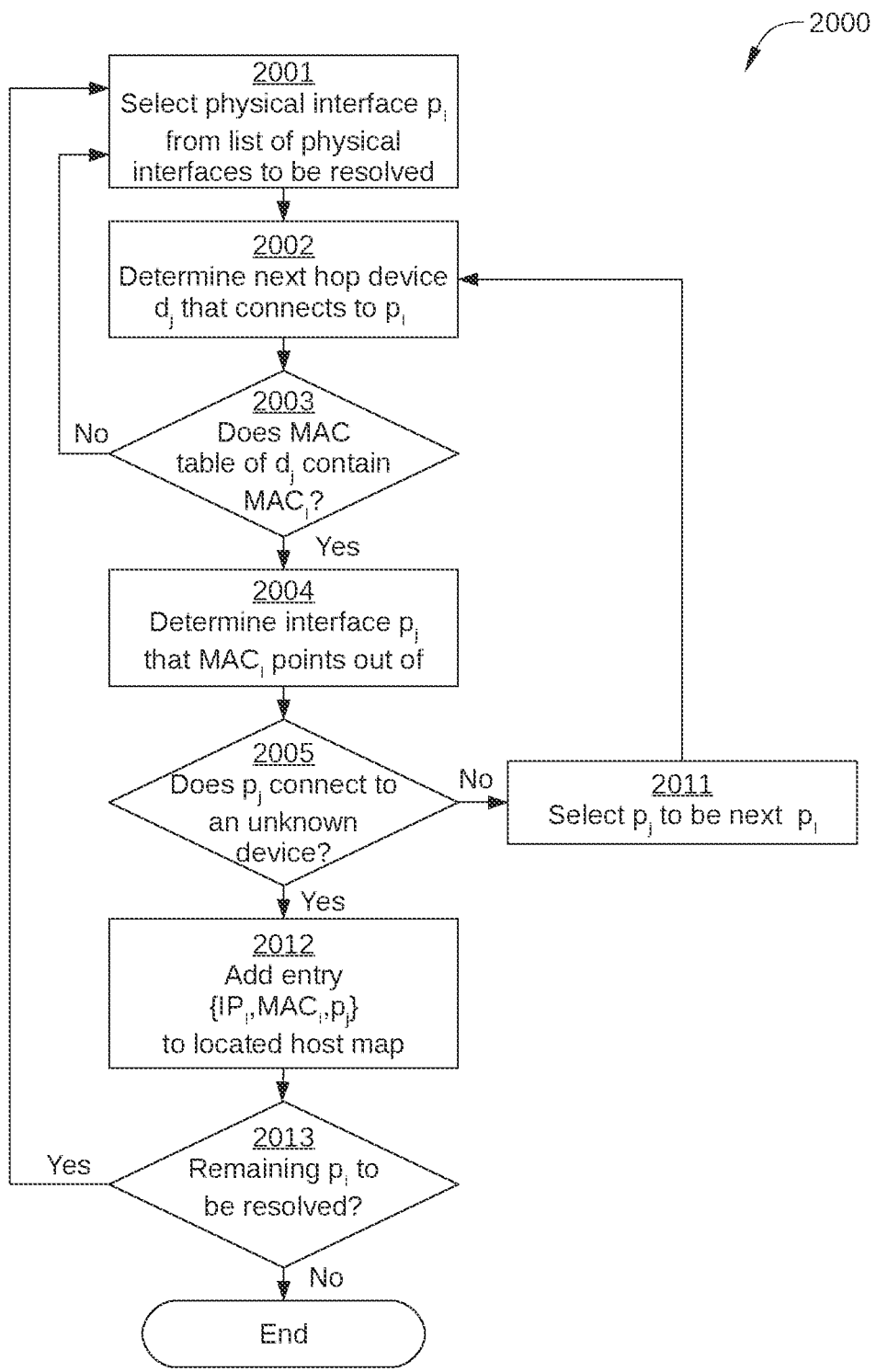
FIG. 20 sets forth a flowchart of method steps for determining host devices based on a list of physical interfaces of a data communication network, according to an embodiment.

FIG. 20 sets forth a flowchart of method steps for determining host devices based on a list of physical interfaces of a data communication network, according to an embodiment. The method steps are performed on a list of physical interfaces $p_I$ in data communication network 102 that have not been determined to be connected to a host or a network device. For example, in some embodiments, the list of physical interfaces $p_I$ is extracted from or otherwise based on the needs resolution map referenced in method 1900. Although the method steps are described in conjunction with network topology inference system 100 of FIGS. 1-19, persons skilled in the art will understand that the method steps may be performed with other types of systems.

A method 2000 begins at step 2001, when network modeler 105 selects a physical interface $p_I$ from the list of physical interfaces to be resolved to a host device that is generated from the needs resolution map. In step 2002, network modeler 105 determines the next hop device $d_j$ that connects to the physical interface $p_I$ selected in step 2001. In step 2003, network modeler 105 determines whether the MAC table of next hop device $d_j$ contains the MAC address MACI of the physical interface $p_I$ selected in step 2001. If no, method 2000 returns to step 2001; if yes, method 2000 proceeds to step 2004. In step 2004, network modeler 105 determines the physical interface $p_j$ that MACI points out of. In step 2005, network modeler 105 determines whether physical interface $p_j$ connects to an unknown device. That is, network modeler 105 determines whether physical interface $p_j$ connects to a host (unknown) device or a network (known) device. If physical interface $p_j$ connects to a known device, method 200 proceeds to step 2011; if physical interface $p_j$ connects to an unknown device, method 200 proceeds to step 2012.

In step 2011, network modeler 105 selects physical interface $p_j$ to be the next physical interface $p_j$ to be examined, and method 2000 returns back to step 2002. In step 2012, network modeler 105 adds an entry associated with physical interface $p_j$ to the located host map. For example, in an embodiment, network modeler 105 add an entry {IPI, MACI, $p_j$}, since physical device $p_j$ indicates connection to a host device. In step 2013, network modeler 105 determines whether there are any remaining physical interfaces $p_I$ to be resolved to a host device. If yes, method 2000 returns to step 2001; if no, method 2000 terminates and the located host map is complete.

Flow Path Determination

One or more embodiments provide systems and methods for interactive access to a network model that provides state and predicted flow behavior of a particular computer network. Specifically, a search engine queries the network model for behavior of the entire network, such as data flow, based on combinations of multiple network elements. In some embodiments, the search engine provides the state information and/or predicted behavior of the network by searching network objects in a graph-based model or a network state database that satisfy constraints given in a search query. Further, the search engine provides the state information and/or predicted behavior based on regular-expression or plain language search expressions. The search engine parses such search expression into a sequence of atoms that encode forwarding paths of interest to the user.

In some embodiments, network topology inference system 100 includes a search query engine 119, according to various embodiments. Search query engine 119 is configured to search a network model of data communication network 102 to obtain objects and data flow behavior in response to a user search query. Examples of suitable models include snapshots 109 of data communication network 102. One embodiment of search query engine 119 is described below in conjunction with FIG. 21.

Figure 21:
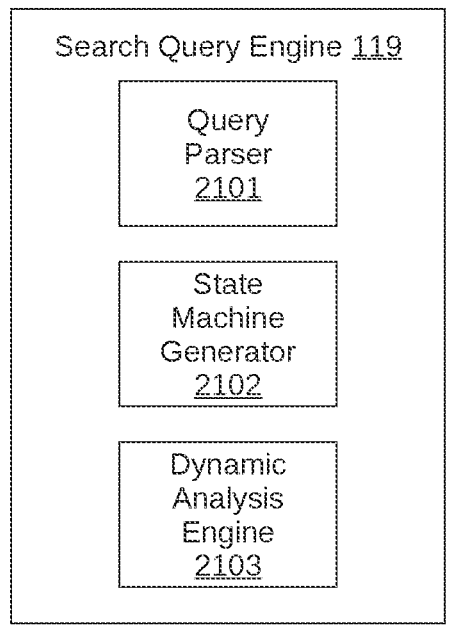
FIG. 21 is a schematic illustration of the search query engine of FIG. 1, according to various embodiments.

FIG. 21 is a schematic illustration of search query engine 119, according to various embodiments. In the embodiment illustrated in FIG. 21, search query engine 119 includes a query parser 2101, a state machine generator 2102, and a dynamic analysis engine 2103.

Query parser 2101 is configured to convert a regular-expression-based user query to elements that can be employed in an object search, an Internet protocol (IP) address search, or a path search. Query parser 2101 enables a user to enter plain language queries, for example via graphical user interface 117, to perform a search in a network model. For example, according to various embodiments, a user can enter queries such as "can any of my private VLANs leak onto one another?" or "are any of my host-facing ports vulnerable to rogue DHCP servers?". Because user queries can be expressed at a high level, the user can express intent, and is not limited to working with a more complex and error-prone low-level query language.

In operation, query parser 2101 processes a regular-expression-based user query string by parsing the string into a list of atoms, where some or all of the atoms can encode forwarding paths of interest, logical operators, vendor names, object names, network traffic descriptors, and the like. In some embodiments, each atom is a descriptor for network location and packet header values. Query parser 2101 then organizes the sequence of atoms, for example to show the precedence of the operators. In some embodiments, an abstract syntax tree (AST) may be used to organize the sequence of atoms. For example, in such embodiments, each atom recognized to be a traffic descriptor is converted into a sub-syntax tree, and then into a traffic classification representation associated with the network model being queried. Atoms recognized to be location descriptors may be resolved into a set of physical or logical network elements by querying the database. For instance, in one embodiment, any of the query entries "device.type=firewall", "device=firewall", or "firewall".)". In another embodiment, query parser 201 is configured to infer action-level constraints (such as certain packet-processing functions) from location constraints included in or atoms resolved from a query entry. Thus, in such embodiments, query parser 201 may enhance a query entry to include a suitable action constraint (for example, dropping certain packets). In this way, user intent is implemented in a search without relying on the user to explicitly enter low-level information like rule actions.

In some embodiments, query parser 2101 is configured to infer addresses associated with starting and ending locations of a path query when traffic is not specified by a user in the path query. That is, query parser 2101 is configured to perform traffic inference. For example, for the query "from A to B", the query has specified nothing about traffic/packet headers. Therefore, in certain embodiments, query parser 2101 assumes the IP and MAC address of location A to be the starting source IP and source MAC for the query, and similarly assumes the IP and MAC of location B to be the final destination IP and destination MAC for the query. In the embodiment, when location A and B are located in the same subnet, then the starting destination addresses are set to the MAC and IP of location B. Otherwise, the starting destination MAC is set to the gateway MAC of location A, and the starting destination IP is set to the IP of location B, to route the flow outside of the local subnet of location A towards location B.

State machine generator 2102 is configured to compile some or all of the atoms derived from a query string into a state machine equivalent to the regular expression of the user query string. In such embodiments, a nondeterministic finite automaton (NFA) may be built out of the atoms using an algorithm based on Thompsons construction. The NFA for a query is built up from partial NFAs for each subexpression (atom), with a different construction for each operator (e.g., concatenation, alternation, grouping, etc.). In instances in which traffic classification operators represent a combination of states (e.g., certain reachability operators employed in network verification), such traffic classification operators may be first expanded into a sequence of atoms internally, and then translated into a partial NFA. In some embodiments, a state machine equivalent that is generated by state machine generator 2102 can be represented by a graph. One such graph is illustrated in FIG. 22.

Figure 22:
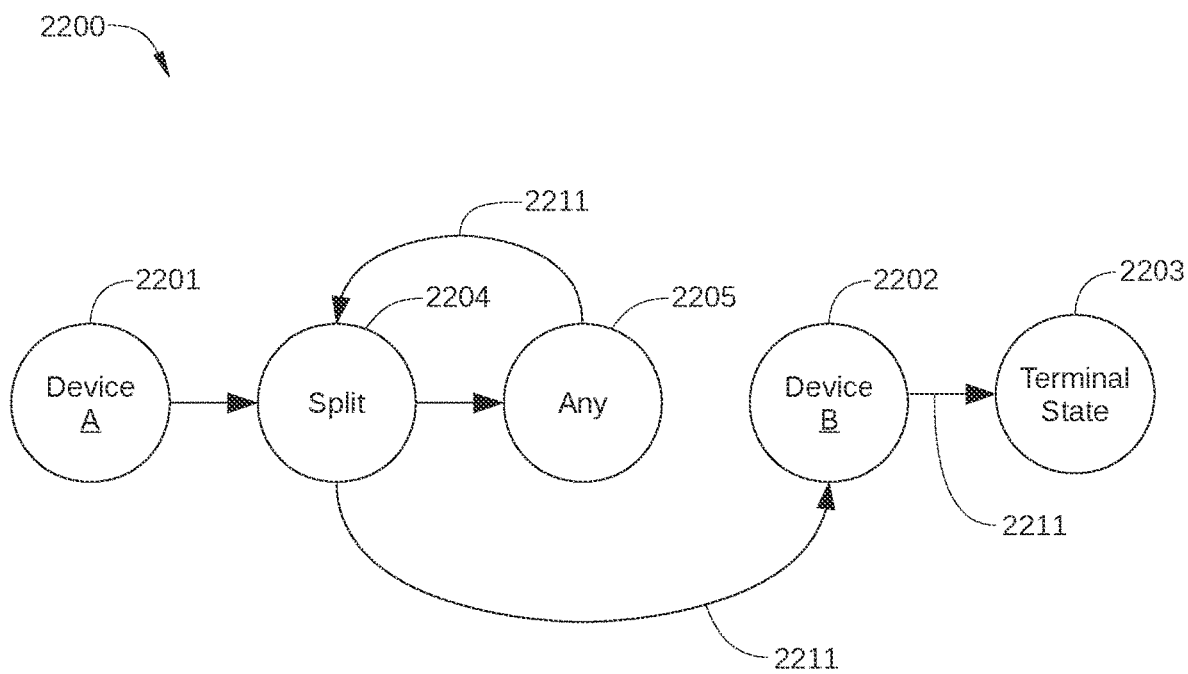
FIG. 22 is a state machine graph that is generated by the state machine generator of FIG. 21, according to an embodiment.

FIG. 22 is a state machine graph 2200 that is generated by state machine generator 2102, according to an embodiment. State machine graph 2200 is generated in response to a user query of a particular network model. In the embodiment illustrated in FIG. 22, state machine graph 2200 represents, in terms of implementing a search query of a network model, the user query "can device A reach device B?". As shown, state machine graph 2200 includes a first state 2201 that corresponds to an IP address or object location associated with device A, a second state 2202 that corresponds to an IP address or object location associated with device B, a terminal state 2203, and two transition states 2204 and 2205. State machine graph 2200 further includes appropriate transitions 2211 between the above-described states. The state machine represented by state machine graph 2200 starts at first state 2201 (i.e., device A) and, after none or an arbitrary number of device hops, ends at second state 2202 (i.e., on device B). Thus, the state machine represented by state machine graph 2200 is similar in function to the regular string pattern "A.*B", which follows a conventional query language format.

Returning to FIG. 21, dynamic analysis engine 2103 is configured to determine whether there are paths in the graph-based network model that satisfy the query, where the graph-based network model represents all possible network behaviors. Using the graph-based network model as input, dynamic analysis engine 2103 determines the set of paths satisfying the query by traversing the graph-based network model guided by the state machine generated by state machine generator 2102.

In operation, a traversal of the graph-based network model begins at the graph nodes that match the start state of the state machine. From then on, the traversal continues when a next hop node of the current graph node matches any of the directly reachable states in the state machine. The traversal process may be continued in a depth first search manner, until the end of the graph exploration. Embodiments of such a traversal process is described below in conjunction with FIGS. 23-28.

Figure 23:
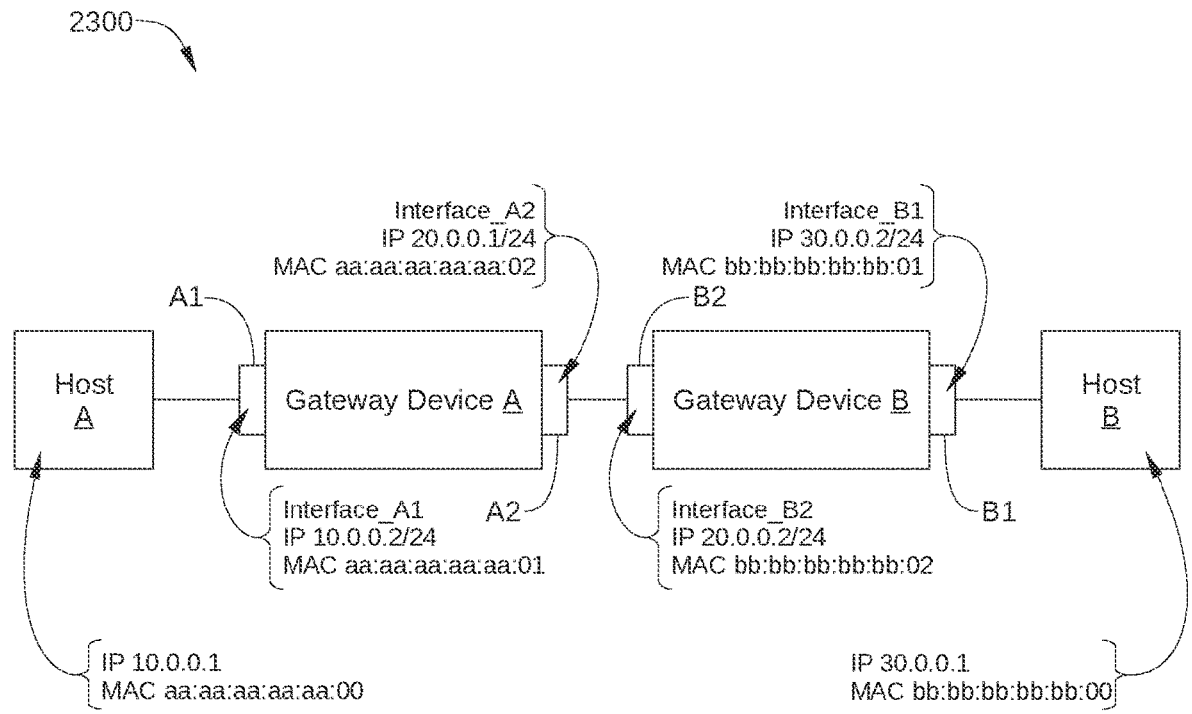
FIG. 23 is a schematic illustration of a simple physical network which can be traversed by the dynamic analysis engine of FIG. 21, according to an embodiment.

FIG. 23 is a schematic illustration of a simple physical network 2300 which can be traversed by dynamic analysis engine 2103, according to an embodiment. As shown, physical network 2300 includes a host A communicatively coupled to a gateway device A and a host B communicatively coupled to a gateway device B. In addition, gateway device A is communicatively coupled to gateway device B. Host A and host B each have IP addresses and MAC addresses as shown, and are located in two different IP subnets.

Gateway devices A and B can each be any technically feasible hardware device that acts as a gateway between two networks or subnets. Thus, gateway device A and/or gateway device B may be a router, a firewall, a server, or any other device that enables data traffic to flow in and out of the nodes of an associated network or subnet. Further, gateway devices A and B are generally also nodes within the associated network or subnet. Gateway device A includes interfaces A1 and A2 with IP addresses and MAC addresses as shown and gateway device B includes interfaces B1 and B2 with IP addresses and MAC addresses as shown. In the embodiment illustrated in FIG. 23, gateway device A and gateway device B are directly connected, and interfaces A1, A2, B1, and B2 are Layer 3 interfaces. In other embodiments, many other network devices may be communicatively disposed between gateway device A and gateway device B.

Figure 24:
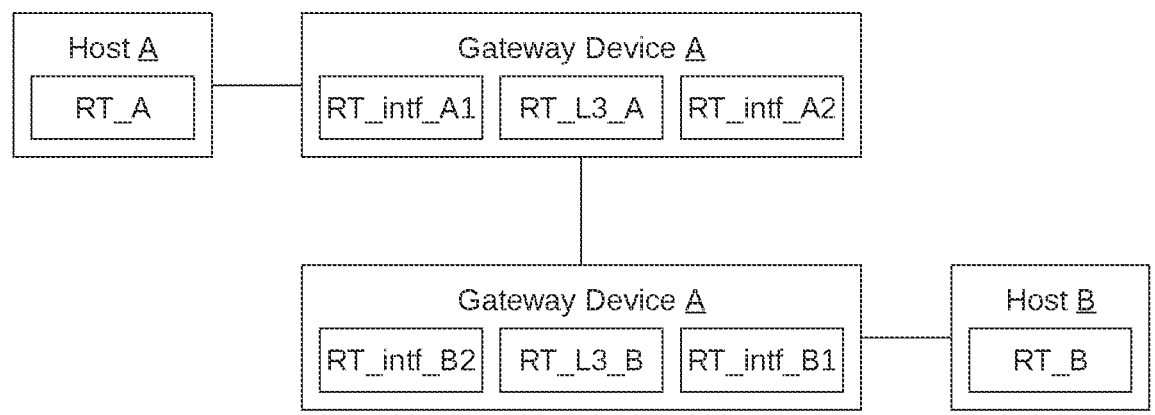
FIG. 24 is a schematic illustration of a static network model of the physical network of FIG. 23, according to an embodiment.

FIG. 24 is a schematic illustration of a static network model 2400 of physical network 2300, according to an embodiment. Static network model 2400 represents a graph-based model of physical network 2300 that is configured with nodes and directed actions between the nodes. Thus, static network model 2400 is a rule table level static model of physical network 2300 and, as such, includes at least one rule table for each node of physical network 2300. Specifically, host A includes rule table RT_A, host B includes rule table RT_B, gateway device A includes rule tables RT_intf_A1, RT_L3_A, and RT_intf_A2, and gateway device B includes rule tables RT_intf_B1, RT_L3_B, and RT_intf_B2.

In static network model 2400, a rule table (RT) is a table inside a particular forwarding device, and includes rules that define the forwarding of packets from that forwarding device. For example, the IP routing table, the MAC address table, the ARP table, and the like can be or included in rule tables for host A, host B, gateway device A, and gateway device B. In addition to rule tables, flow nodes are employed in static network model 2400 to facilitate traversal via dynamic analysis engine 2103. Embodiments of flow nodes associated with static network model 2400 are described below in conjunction with FIG. 25.

Figure 25:
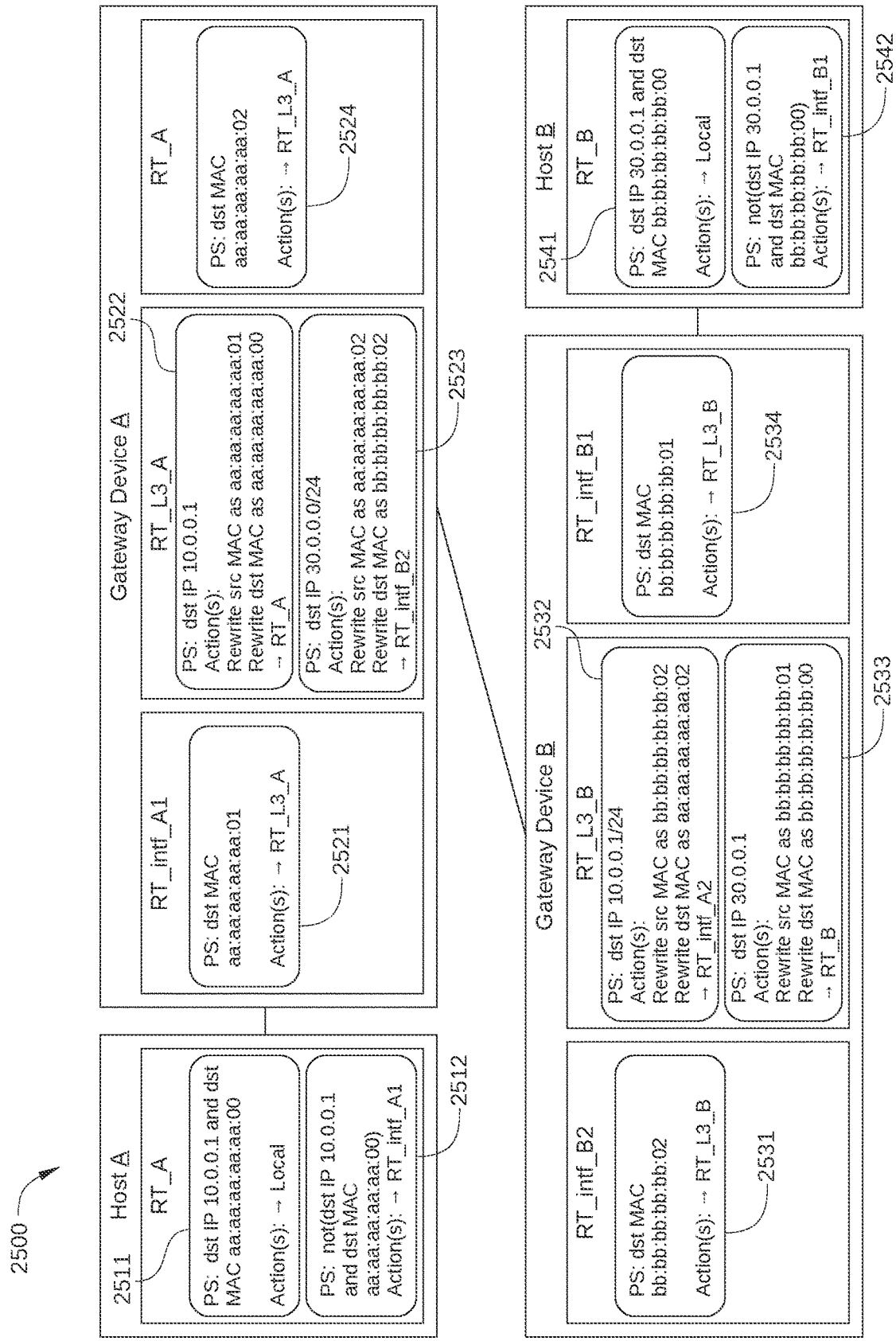
FIG. 25 is a schematic illustration of a static network model of the physical network of FIG. 23 that includes flow nodes, according to an embodiment.

FIG. 25 is a schematic illustration of a static network model 2500 of physical network 2300 that includes flow nodes, according to an embodiment. A flow node (FN) represents a pair consisting of a rule table and a packet set, where a packet set is a group of hypothetical packets to be sent to a defined group or range of IP addresses. Thus, a flow node is a vertex in a graph model of a network, and indicates how a particular network object treats packets that belong to a particular packet set. In some embodiments, the data structure of a flow node includes a packet set and a list of one or more actions. In the embodiment illustrated in FIG. 25, host A includes flow nodes 2511 and 2512, gateway device A includes flows nodes 2521, 2522, 2523, and 2524, gateway device B includes flows nodes 2531, 2532, 2533, and 2534, and host B includes flow nodes 2541 and 2542.

According to various embodiments, dynamic analysis engine 2103 is configured to serve queries using dynamic analysis of search paths. That is, dynamic analysis engine 2103 dynamically enhances static network model 2500 within the context of (or during the course of) each query. Thus, in operation, dynamic analysis engine 2103 starts traversal of static network model 2500 at various starting points using the packet set relevant to the query. Dynamic analysis engine 2103 then traverses vertices of network model 2500 hop-by-hop, keeping track of how the query packet set shrinks, grows, or otherwise transforms. That is, dynamic analysis engine 2103 employs dynamic equivalence classes. In addition, in the case of bidirectional flow queries, dynamic analysis engine 2103 tracks stateful rule correlations. Further, dynamic analysis engine 2103 generates reply packet sets when traversals reach control planes or hosts. Such search path dynamic analysis is described below in conjunction with FIG. 26.

Figure 26:
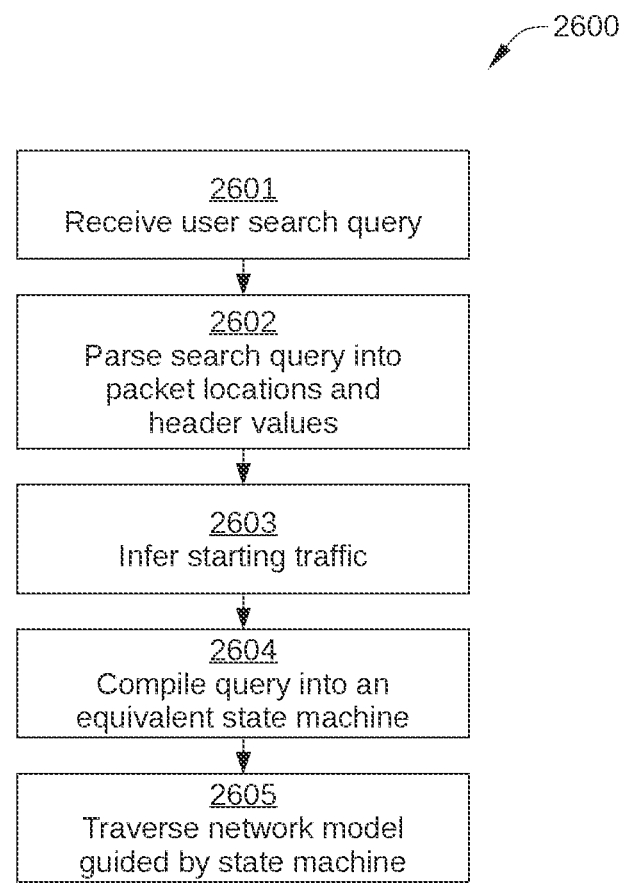
FIG. 26 sets forth a flowchart of method steps for performing dynamic analysis of a search path, according to an embodiment.

FIG. 26 sets forth a flowchart of method steps for performing dynamic analysis of a search path, according to an embodiment. Although the method steps are described in conjunction with network topology inference system 100 of FIGS. 1-7, persons skilled in the art will understand that the method steps may be performed with other types of systems.

A method 2600 begins at step 2601, when search query engine 119 receives a user search query that includes regular expression terms. For example, the search query "from A to B" is applied as a query regarding physical network 2300. In step 2602, query parser 2101 of search query engine 119 parses the search query into predicates on packet location and header values associated with physical network 2300. In step 2603, from the starting and ending locations, query parser 2101 infers that the starting traffic (Start_traffic) is: "ip src 10.0.0.1 and ip dst 30.0.0.1 and src MAC aa:aa:aa: aa:aa:00 and dst MAC aa:aa:aa:aa:aa:01". In step 2604, state machine generator 2102 compiles the regular-expression-like query into an equivalent state machine (NFA), as illustrated in FIG. 27.

Figure 27:
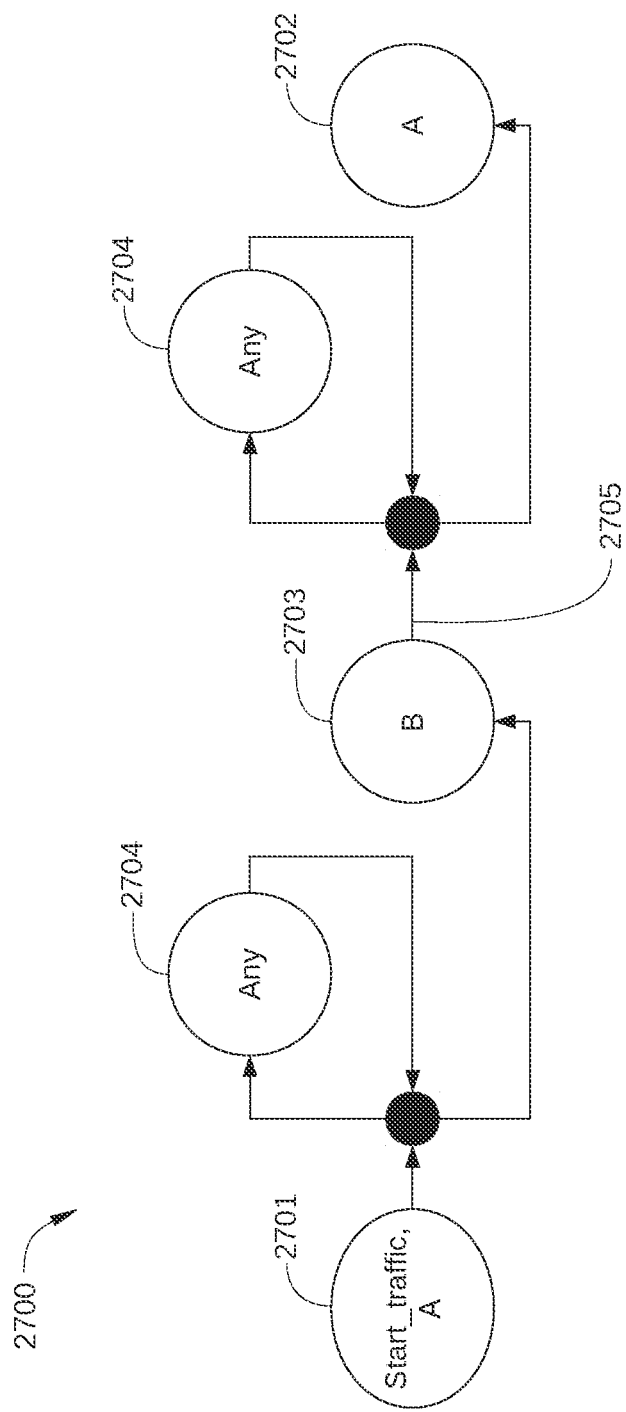
FIG. 27 schematically illustrates a state machine generated to facilitate dynamic analysis of a search path, according to an embodiment.

FIG. 27 schematically illustrates a state machine 2700 generated to facilitate dynamic analysis of a search path, according to an embodiment. As shown, state machine 2700 includes a start_traffic state 2701 that is based on a tuple (starting traffic, location A), a location A state 2702 and a location B state 2703, two "any" states 2704, and a reply edge 2705. It is noted that query parser 2101 infers start_traffic state 2701, location A state 2702, location B state 2703, and reply edge 2705 in step 2603.

Returning to FIG. 26, in step 2605, dynamic analysis engine 2103 of search query engine 119 retrieves paths matching the query by traversing static network model 2500 guided by state machine 2700. More specifically, dynamic analysis engine 2103 performs such a forward path traversal as follows. From starting state of state machine 2700 (i.e., the starting traffic and location tuple (start_traffic, A)), dynamic analysis engine 2103 finds matching starting flow nodes, which in this case is the second flow node on RT_A.

As shown in FIG. 25, the starting flow node has an action to forward the traffic to rule table RT_intf_A1 on Gateway_A. Thus, the traffic of interest is the start_traffic: ip src 10.0.0.1 and ip dst 30.0.0.1 and src MAC aa:aa:aa:aa:aa:00 and dst MAC aa:aa:aa:aa:aa:01. Based on the starting traffic flow node information, dynamic analysis engine 2103 dynamically generates flow edges towards the next hop. In particular, dynamic analysis engine 2103 applies the action to the current traffic; transforms the current traffic when necessary (in this example, no transformation on this hop is necessary); determines the next hop rule table when there is a forward action; and intersects the (transformed) traffic with the next hop packet set(s). In the example illustrated in FIGS. 25 and 27, there is one next hop flow node on RT_intf_A1 table, and the overlapping packet set is the same as the original traffic. A dynamic edge with "fromNode" being the second node on RT_A and pointing to the flow node on RT_intf_A1 is created.

On RT_intf_A1 flow node, dynamic analysis engine 2103 determines whether flow node information matches any immediate next state of the current state of state machine 2700. In this instance, the answer is true, because RT_intf_A1 flow node matches the "ANY" state. Dynamic analysis engine 2103 then moves the state machine 2700 to the next state, which is "ANY" and applies the actions of the flow node to the current traffic, which leads to RT_L3_A table and overlaps with the second flow node at that location. Dynamic analysis engine 2103 creates a new flow edge that carries the traversal to RT_L3_A, where both source and destination MAC headers are rewritten, and now the next hop is RT_intf_B2. Now the traffic becomes "ip src 10.0.0.1 and ip dst 30.0.0.1 and src MAC aa:aa:aa:aa:aa:02 and dst MAC bb:bb:bb:bb:bb:02". The above-described procedure continues until the traversal reaches the flow node on rule table RT_B. Because rule table RT_B matches the state "B" of state machine 2700, dynamic analysis engine 2103 moves the current state to B.

In some embodiments, dynamic analysis engine 2103 is further configured to extend a path search to be able to find reply paths associated with a dynamic search of state machine 2700. In such embodiments, a special state transition is added to state machine 2700 to represent a "reply" edge, such as reply edge 2705. As a result, when a forward path reaches a network object that is capable of sending a response and the matching state of state machine 2700 includes a "reply" edge, dynamic analysis engine 2103 flips the ending forward packet set and injects the swapped packet back to the same object. For example, in some embodiments, dynamic analysis engine 2103 swaps source and destination headers of the same protocol, such as source and destination IP and Ethernet addresses. In the embodiment illustrated in FIGS. 25 and 27, the outgoing edge of state "B" is a special "reply" edge, which is a special type of state transition that is added to state machine 2700. Consequently, the reply path should start at the current flow node. An example of using dynamic analysis of a search path for a reply path traversal is now described.

In starting the reply path, dynamic analysis engine 2103 swaps the source and destination headers to simulate the reply traffic. Since the traffic reaching B on the forward path is "ip src 10.0.0.1 and ip dst 30.0.0.1 and src MAC bb:bb: bb:bb:bb:01 and dst MAC bb:bb:bb:bb:bb:00", the reply traffic becomes "ip src 30.0.0.1 and ip dst 10.0.0.1 and src MAC bb:bb:bb:bb:bb:00 and dst MAC bb:bb:bb:bb:bb:01". Dynamic analysis engine 2103 injects the reply traffic back to RT_B. On RT_B, the dynamically generated reply traffic matches the second flow node, so that is where the reply path traversal begins. Next, similar to the forward path traversal, dynamic analysis engine 2103 creates a dynamic flow edge pointing to RT_intf_B1 and the state of state machine 2700 is moved to the second "ANY" state. The traversal then reaches RT_L3 B's first flow node, where source and destination MAC headers are rewritten and the traffic is forwarded to gateway A. Finally, the traversal ends at RT_A, matching the first flow node there, and at the same time matching the terminating state of state machine 2700.

In some embodiments, the above-described dynamic analysis capability of search query engine 119 is further leveraged by incorporating stateful modeling into a search procedure. Stateful operation is fundamental to many network protocols, including network address translation (NAT) and access control. Thus, modeling the stateful behavior is beneficial for network modeling and verification tools. In such embodiments, when the location is a stateful forwarding object, such as a NAT table, dynamic analysis engine 2103 is configured to track what packet set is hit and on which location the hit occurs on the forward traversal. Further, in such embodiments, on the reply path, on such stateful forwarding locations, dynamic analysis engine 2103 first checks if the swapped version of the current packet set has been hit on the forward path before checking flow node state matching. For example, a reply packet is only allowed to pass a stateful access control list (ACL) table if a "hole" has been generated in the request direction. An embodiment of a network model search procedure that incorporates stateful modeling is described below in conjunction with FIG. 28.

Figure 28:
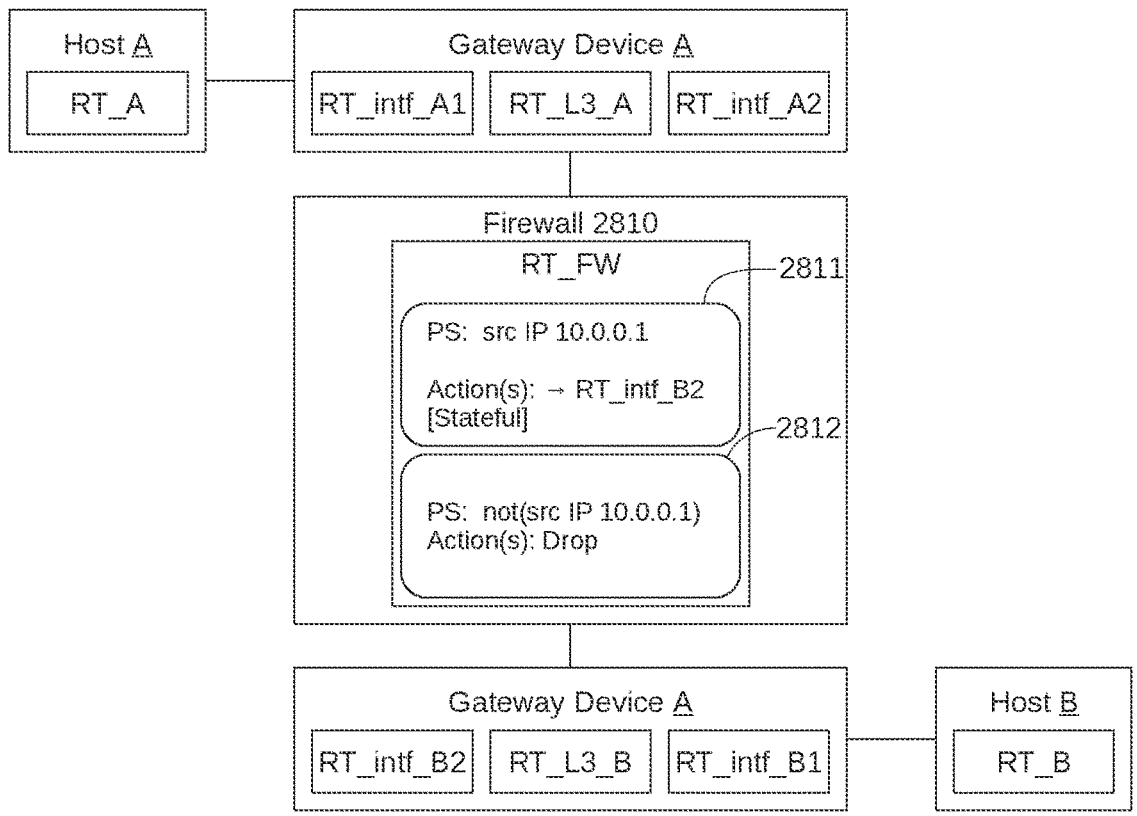
FIG. 28 is a schematic illustration of a static network model of a physical network that includes a firewall, according to an embodiment.

FIG. 28 is a schematic illustration of a static network model 2800 of a physical network (not shown) that includes a firewall 2810, according to an embodiment. Static network model 2800 is substantially similar to static network model 2500, except that static network model 2800 includes firewall 2810. As shown, firewall 2810 includes firewall rule table RT_FW, and is configured to protect host A from host B via a firewall policy that allows host A to initiate a connection to outside a portion of the physical network that is outside firewall 2810, but denies any connection initiated from outside firewall 2810 to host A. In the instance shown, firewall 2810 includes one rule table with two flow nodes 2811 and 2812. The flow node 2811 allows any traffic coming from host A (i.e., where the source IP is the IP of host A) to the outside in a stateful fashion. Traffic coming "in a stateful fashion" is described in detail below. The flow node 2812 denies all other traffic. Firewall 2810 enforces this policy by statefully remembering that replies from a particular destination are forwarded back to host A if and only if host A has sent a request to that particular destination.

In static network model 2800, when a user enters a "from A to B" search, the traversal procedure works the same way as that described for static network model 2500 of FIG. 25, until traffic exits gateway device A. Instead of entering gateway device B, the traffic reaches firewall rule table RT_FW. Because the source IP received from traffic inference is 10.0.0.1, the forward traffic matches the flow node 2811. Thus, the action of flow node 2811 allows firewall 2810 to forward traffic to gateway device B by creating a dynamic edge. In addition, dynamic analysis engine 2103 keeps a state that a request traffic "ip src 10.0.0.1 and ip dst 30.0.0.1 and src MAC aa:aa:aa:aa:aa:02 and dst MAC bb:bb:bb:bb:bb:02" passes through the firewall, so that a future reply to this request can be allowed through.

On the reply path, when the reply traffic leaves gateway device B, the reply traffic enters firewall 2810 again. Now the traffic is "ip src 30.0.0.1 and ip dst 10.0.0.1 and src MAC bb:bb:bb:bb:bb:02 and dst MAC bb:bb:bb:bb:bb:02", which with flipped source and destination exactly matches the state retained in the firewall. That is, the reply traffic matches the "hole" formed on the forward path of firewall 2810. The firewall now knows the traffic is a reply to a connection initiated by host A, so the reply traffic passes through to gateway device A. In another example, a third host C (not shown) tries to initiate a request to host A. When the request reaches firewall 2810, the request traffic does not match any state on firewall 2810, so the request traffic is dropped.

Figure 29:
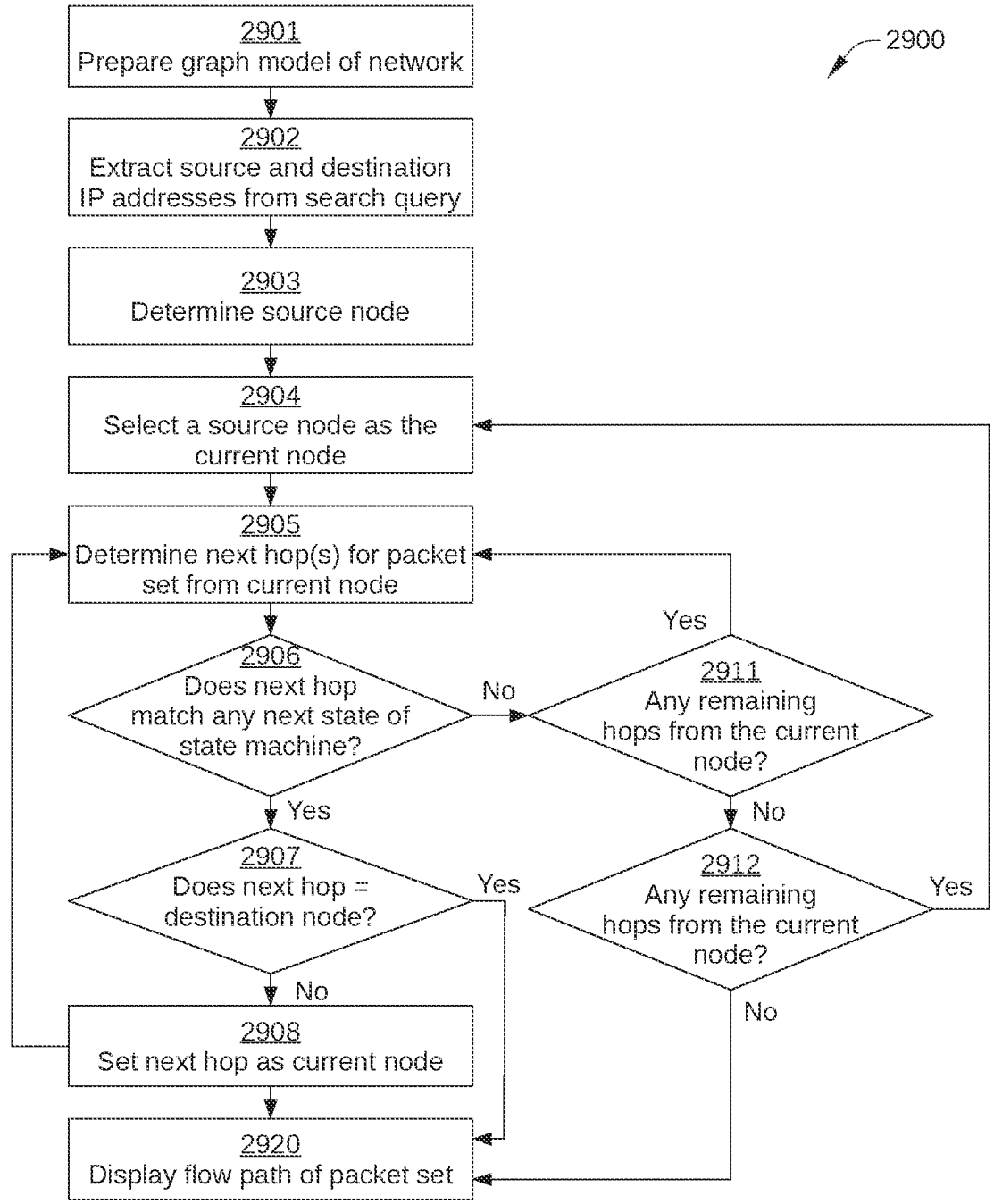
FIG. 29 sets forth a flowchart of method steps for performing dynamic analysis of a search path, according to an embodiment.

FIG. 29 sets forth a flowchart of method steps for performing dynamic analysis of a search path, according to an embodiment. Although the method steps are described in conjunction with network topology inference system 100 of FIGS. 1-10, persons skilled in the art will understand that the method steps may be performed with other types of systems.

A method 2900 begins at step 2901, when search query engine 119 prepares a graph model of a physical network, such as a graph-based model 107 of data communication network 102. It is noted that generally, graph-based model 107 is generated one time for a particular configuration of data communication network 102, and is typically regenerated when data communication network 102 is modified. Otherwise, method 2900 is performed many times with the same graph-based model 107. In step 2902, query parser 2101 extracts source and destination locations (e.g., IP addresses or other packet header fields) and traffic specifications from a search query. In some embodiments, query parser 2101 processes a regular-expression-based user query string included in the query by parsing the string into a list of atoms, where some or all of the atoms can encode forwarding paths of interest, logical operators, vendor names, object names, network traffic descriptors, packet sets, and the like. In step 2903, query parser 2101 determines a source node or nodes from the query, for example via traffic inference. In step 2904, dynamic analysis engine 2103 selects a source node to be the current node. It is noted that there can be multiple source nodes associated with a single query. In step 2905, dynamic analysis engine 2103 determines the next hop or hops from the current node for the packet set associated with the query. In instances in which multiple next hops radiate from the current node, each such next hop is explored, as set forth below.

In step 2906, dynamic analysis engine 2103 determines whether a next hop determined in step 2905 matches any next state of a state machine that is compiled based on the search query. If yes, method 2900 proceeds to step 2907; if no, method 2900 proceeds to step 2911. In step 2907, dynamic analysis engine 2103 determines whether the next hop is the destination node of the query. If yes, method 2900 proceeds to step 2920; if no, method 2900 proceeds to step 2908. In step 2908, dynamic analysis engine 2103 sets the next hop to be the current node and method 2900 returns to step 2905. In step 2911, dynamic analysis engine 2103 determines whether there are any remaining next hops from the current node. If yes, method 2900 returns to step 2905; if no, method 2900 proceeds to step 2912. In step 2912, dynamic analysis engine 2103 determines whether there are any remaining source nodes to be examined. If yes, method 2900 returns to step 2904; if no, method 2900 proceeds to step 2920. In step 2920, search query engine 119 causes the flow path of query packet set to be displayed to the user.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, NAS, read-only memory (ROM), RAM (e.g., flash memory device), Compact Disk (e.g., CD-ROM, CD-R, or CD-RW), Digital Versatile Disk (DVD), magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, modifications, additions, and improvements may fall within the scope of the appended claims.

We claim:

1. In a network of devices, a method of determining a flow path between two of the devices in response to a search query, said method comprising:
processing the search query into a plurality of atoms, the plurality of atoms including descriptors for network locations and an action constraint inferred from the descriptors;
extracting source and destination location information from network locations specified by the plurality of atoms in the search query;
determining a first subnet associated with the source location information and a second subnet associated with the destination location information;
upon determining that the first subnet and the second subnet are the same subnet, determining a first flow path between a first device associated with the source location information and a second device associated with the destination location information, using the destination location information and a MAC address of the second device; and
upon determining that the first subnet and the second subnet are not the same subnet, determining a second flow path between the first device and the second device using the destination location information and a MAC address of a gateway device of the first subnet;
wherein the steps of determining the first flow path and determining the second flow path comprise compiling the plurality of atoms into a state machine including a plurality of states and transitions between the plurality of states representing a regular expression of the descriptors and the action constraint.

2. The method of claim 1, wherein
the source and destination location information includes at least one of an Internet protocol (IP) address, a media access control (MAC) address and a gateway address.

3. The method of claim 1, wherein
the first flow path starts at the first device and ends with the second device and traverses a first set of devices and the second flow path starts at the second device and ends with the first device and traverses a second set of devices that are different from the first set of devices.

4. The method of claim 3, wherein
the first set of devices and the second set of devices include a common device that changes state and a change in the state thereof causes the first flow path and the second flow path to traverse through different sets of devices.

5. A non-transitory computer readable medium comprising instructions which when executed in a computer system causes the computer system to carry out a method of determining a flow path between two of the devices in response to a search query, said method comprising:
processing the search query into a plurality of atoms, the plurality of atoms including descriptors for network locations and an action constraint inferred from the descriptors;
extracting source and destination location information from a network locations specified by the plurality of atoms in the search query;
determining a first subnet associated with the source location information and a second subnet associated with the destination location information;
upon determining that the first subnet and the second subnet are the same subnet, determining a first flow path between a first device associated with the source location information and a second device associated with the destination location information, using the destination location information and a MAC address of the second device; and upon determining that the first subnet and the second subnet are not the same subnet, determining a second flow path between the first device and the second device using the destination location information and a MAC address of a gateway device of the first subnet;

wherein the steps of determining the first flow path and determining the second flow path comprise compiling the plurality of atoms into a state machine including a plurality of states and transitions between the plurality of states representing a regular expression of the descriptors and the action constraint.

6. The non-transitory computer readable medium of claim 5, wherein
the source and destination location information includes at least one of an Internet protocol (IP) address, a media access control (MAC) address and a gateway address.

7. The non-transitory computer readable medium of claim 5, wherein
the first flow path starts at the first device and ends with the second device and traverses a first set of devices and the second flow path starts at the second device and ends with the first device and traverses a second set of devices that are different from the first set of devices.

8. The non-transitory computer readable medium of claim 7, wherein
the first set of devices and the second set of devices include a common device that changes state and a change in the state thereof causes the first flow path and the second flow path to traverse through different sets of devices.

* * * * *